US010158991B2

(12) United States Patent
Link, II

(10) Patent No.: US 10,158,991 B2
(45) Date of Patent: *Dec. 18, 2018

(54) METHOD AND SYSTEM FOR MANAGING SECURITY KEYS FOR USER AND M2M DEVICES IN A WIRELESS COMMUNICATION NETWORK ENVIRONMENT

(71) Applicant: M2MD Technologies, Inc., Atlanta, GA (US)

(72) Inventor: Charles M. Link, II, Atlanta, GA (US)

(73) Assignee: M2MD TECHNOLOGIES, INC., Atlanta, GA (US)

( * ) Notice: Subject to any disclaimer, the term of this patent is extended or adjusted under 35 U.S.C. 154(b) by 205 days.

This patent is subject to a terminal disclaimer.

(21) Appl. No.: 15/141,487

(22) Filed: Apr. 28, 2016

(65) Prior Publication Data

US 2017/0272944 A1    Sep. 21, 2017

Related U.S. Application Data

(60) Provisional application No. 62/309,639, filed on Mar. 17, 2016.

(51) Int. Cl.
*H04W 4/70* (2018.01)
*H04L 9/08* (2006.01)
(Continued)

(52) U.S. Cl.
CPC ........... *H04W 12/06* (2013.01); *H04L 9/0841* (2013.01); *H04L 9/3234* (2013.01); *H04L 63/06* (2013.01);
(Continued)

(58) Field of Classification Search
CPC ..... H04W 12/06; H04W 4/005; H04W 76/02; H04L 9/006; H04L 9/14; H04L 9/30;
(Continued)

(56) References Cited

U.S. PATENT DOCUMENTS 9,338,649 B2 * 5/2016 Schell .................. H04L 63/062
2003/0200433 A1 * 10/2003 Stirbu .................. H04L 9/0844
713/169
(Continued)

OTHER PUBLICATIONS

Saxena, Neetesh; Thomas, Jaya; Chaudhari, Narendra. "ES-AKA: An Efficient and Secure Authentication and Key Agreement Protocol for UMTS Networks", Wireless Personal Communications, Oct. 2015, vol. 84 Issue 3, p. 1981-2012, 32p (Year: 2015).*
(Continued)

*Primary Examiner* — Theodore C Parsons
*Assistant Examiner* — Sameera Wickramasuriya
(74) *Attorney, Agent, or Firm* — John L. Doughty; Doughty Law, L.L.C.

(57) ABSTRACT

Pre Shared Keys ("PSK") for application and data session security are generated using application authentication secret values stored in a SIM device/card. The SIM internally uses the secret values as inputs to a security algorithm engine, but the secret values are not accessible outside of the SIM. The application authentication secret values cannot be used to authenticate the SIM, or a device that includes the SIM, to a communication network. Rather, symmetric keys and keying material are generated for use by applications outside of the standard and conventional wireless networking uses of a SIM device. Updated PSKs are generated at different network endpoints such that the PSKs are generated individually and separately at the endpoints; the 'preshared' keys are not actually shared. Thus, a client endpoint and a server endpoint, or an endpoint associated with the server, independently generate the same PSK without the PSK being transmitted between the endpoints.

20 Claims, 22 Drawing Sheets

(51) Int. Cl.
*H04L 9/22* (2006.01)
*H04W 4/60* (2018.01)
*H04W 12/06* (2009.01)
*H04L 29/06* (2006.01)
*H04W 76/10* (2018.01)
*H04L 9/32* (2006.01)

(52) U.S. Cl.
CPC .......... *H04L 63/0876* (2013.01); *H04W 4/70* (2018.02); *H04W 76/10* (2018.02); *H04L 2209/80* (2013.01)

(58) Field of Classification Search
CPC ... H04L 9/3242; H04L 63/06; H04L 63/0876; H04L 63/062
See application file for complete search history.

(56) References Cited

U.S. PATENT DOCUMENTS

| | | | | |
|---|---|---|---|---|
| 2007/0101122 | A1* | 5/2007 | Guo | H04L 63/061 713/153 |
| 2008/0052769 | A1* | 2/2008 | Leone | H04L 63/0272 726/7 |
| 2011/0167272 | A1* | 7/2011 | Kolesnikov | H04L 9/3242 713/171 |
| 2012/0222136 | A1* | 8/2012 | Yamaguchi | H04W 12/10 726/30 |
| 2012/0300939 | A1* | 11/2012 | Du | H04L 63/061 380/279 |
| 2014/0007207 | A1* | 1/2014 | Yang | H04L 63/061 726/6 |
| 2014/0053241 | A1* | 2/2014 | Norrman | H04L 63/08 726/3 |
| 2015/0334111 | A1* | 11/2015 | Ziat | H04W 12/08 713/173 |
| 2016/0234182 | A1* | 8/2016 | Bone | H04L 63/062 |
| 2016/0249214 | A1* | 8/2016 | Li | H04L 63/08 |
| 2016/0353274 | A1* | 12/2016 | Chichierchia | H04B 1/3816 |

OTHER PUBLICATIONS

Yuh-Ren Tsai and Cheng-Ju Chang, "SIM-based subscriber authentication for wireless local area networks," IEEE 37th Annual 2003 International Camahan Conference on Security Technology, 2003. Proceedings., Taipei, Taiwan, 2003, pp. 468-473. (Year: 2003) (Year: 2003).*

* cited by examiner

High Level Flow of Disclosed PSK Key Generation System

FIG 9 — UMTS and LTE Security Parameter Generation

TLS PSK Handshake

FIG 13 Novel PSK Generation in Protected KeyStore and Node/SIM

Novel PSK Generation in PSK Key Generator
(Second of two passes)

FIG 20  Secret Data Stored and Protected per Client

| PASS 1 | PASS 2 | Description | Size of each | Unique or shared | Storage Size MIN | Storage Size MAX |
|---|---|---|---|---|---|---|
| K-1 | K-2 | Shared Secret Key | 16 bytes | Unique | 32 | 32 |
| OP-1 | OP-2 | Shared Secret Aux Key | 16 bytes | Either | 16 | 32 |
| OP_C-1 | OP_C-2 | Shared Secret Aux Key Encrypted | 16 bytes | Either | 16 | 32 |
| C1-1 | | Shared Secret Constant 1 | 16 bytes | | 16 | 16 |
| C2-1 | | Shared Secret Constant 2 | 16 bytes | | 16 | 16 |
| C3-1 | C3-2 | Shared Secret Constant 3 | 16 bytes | Either | 16 | 32 |
| C4-1 | C4-2 | Shared Secret Constant 4 | 16 bytes | Either | 16 | 32 |
| C5-1 | | Shared Secret Constant 5 | 16 bytes | | 16 | 16 |
| R1-1 | | Shared Secret Rotation Value 1 | 1 bytes | | 1 | 1 |
| R2-1 | | Shared Secret Rotation Value 2 | 1 bytes | | 1 | 1 |
| R3-1 | R3-2 | Shared Secret Rotation Value 3 | 1 bytes | Either | 1 | 2 |
| R4-1 | R4-2 | Shared Secret Rotation Value 3 | 1 bytes | Either | 1 | 2 |
| R5-1 | | Shared Secret Rotation Value 5 | 1ytes | | 1 | 1 |
| CURRENT PSK (512 bits) ⌐620 | | Derived PSK from last calculation | 64 bytes | | 64 | 64 |
| SQN | | Sequence Number | 6 bytes | | 6 | 6 |

Total Storage  BYTES  219  285

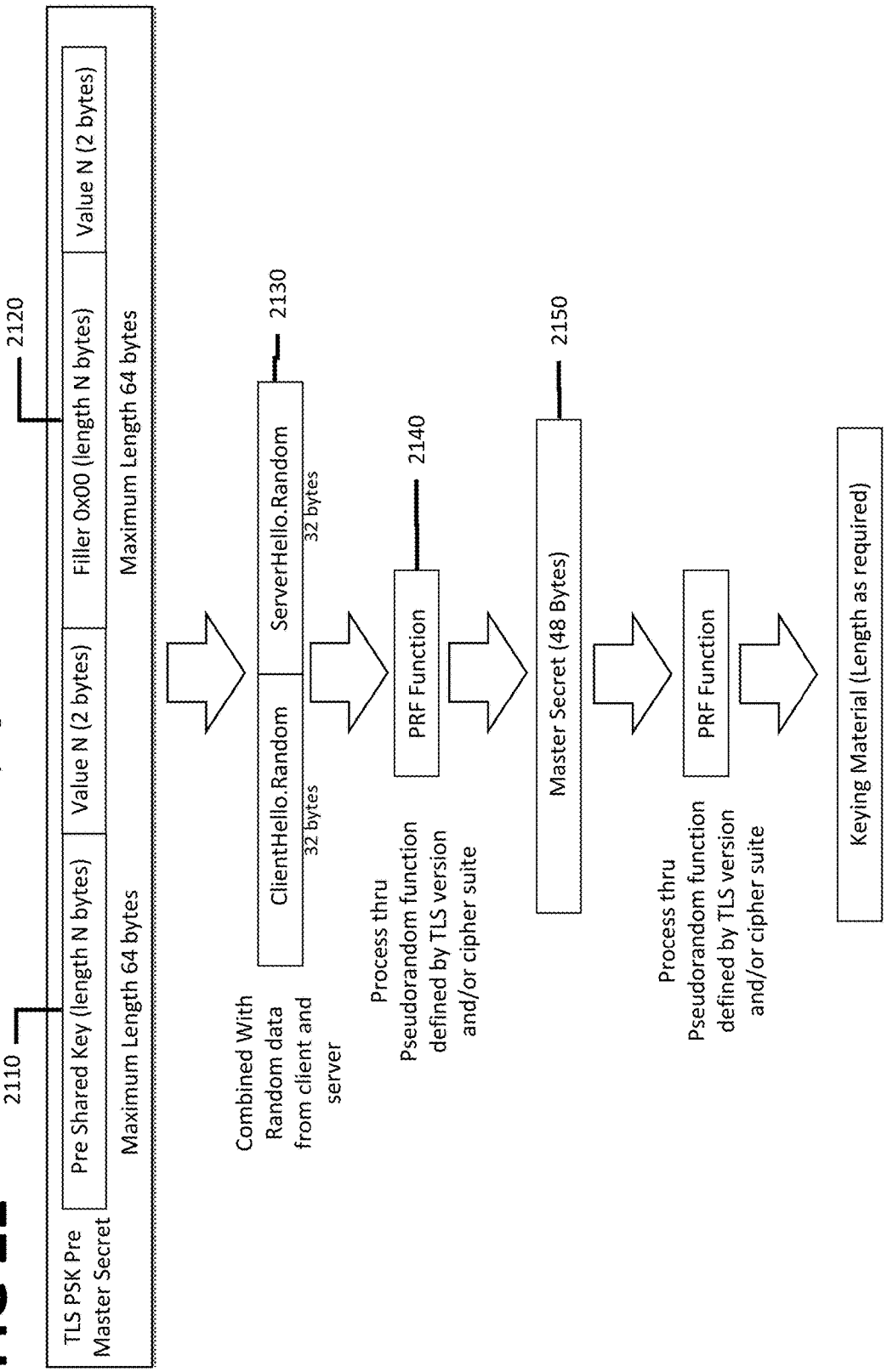

METHOD AND SYSTEM FOR MANAGING SECURITY KEYS FOR USER AND M2M DEVICES IN A WIRELESS COMMUNICATION NETWORK ENVIRONMENT

CROSS REFERENCE TO RELATED APPLICATION

This application claims priority under 35 U.S.C. 119(e) to U.S. provisional patent application No. 62/309,639 entitled "Method and system for managing security keys for user and M2M devices in an LTE and GSM environment," which was filed Mar. 17, 2016, and which is incorporated herein by reference in its entirety.

FIELD

The field relates, generally, to Internet of Things systems and devices and, more particularly, to a system and method for managing application connectivity security, application authorization, and/or application authentication keys for devices connecting to a Wireless Wide Area Network ("WWAN").

BACKGROUND

The Internet of Things ("IoT") is a recent development in which everyday objects have connectivity to data networks allowing them to send and receive data to other devices or systems. The connectivity enables the devices to achieve greater value and service by exchanging data with other systems, servers and controllers. Sometimes this connectivity is used for remotely monitoring and remotely controlling the connected device. IOT systems generally refer to the integrated use of telecommunications devices in embedded systems for transmitting, receiving, controlling, remotely storing and processing information. More simply, IOT refers to smart devices sending, receiving and storing, information via telecommunication devices over the World Wide Web ("WWW").

Other than the convergence of telecommunications and information processing, the term IOT may also refer to automation of various processes relating to the controlling and managing remote devices and systems. For example, an IOT system can report the inventory status of a remote vending machine, operate its e-payment systems, update its advertising display-content on the exterior of the machine and report its interior temperature to provide an enhanced experience for the customers. IOT systems can allow a homeowner to remotely monitor and control the heating and air conditioning systems utilizing a smart thermostat while it is also connecting to centralized servers to support intelligent energy efficiency and consolidated energy usage reports. It may also synchronize the energy usage with other nearby systems to smooth out localized energy usage peaks, lowering overall peak energy demand on public utilities such as electricity and natural gas. It may monitor weather conditions and synchronize water usage for non-essential activities such as landscape watering and fountain or pool water replenishment.

An IOT device may be connected to a larger network, usually the Internet, using an ever-expanding number of methods. Early connected devices were networked with each other using proprietary localized networks created using multi-drop serial networking techniques or simple non-standardized, proprietary wireless networks. Those devices generally communicated with local gateways or controllers and were rarely remotely operable. As wide area networks were established, creative ideas drove the concept of connecting and controlling devices beyond the reach of the local network. As new technologies drive the cost of embedded electronics, sensors, and connectivity lower the interconnection of devices and systems becomes more common.

Another major development that has contributed to the expansion of the IOT is the rollout of centralized "cloud computing" services. Cloud computing allows application software to be operated using centralized, sometimes virtualized, Internet connected services. The foundation of cloud computing is based on the broader concept of shared services and a converged infrastructure. Cloud computing or simply "the cloud" relies on the sharing of resources and the economies of scale to deliver services. Combining the capabilities of the low cost, emerging and connected smart devices with the expanse of connected cloud computing environments has created a technological opportunity to develop innovative solutions that will enhance automation in nearly every aspect of life.

Early Internet connected devices required complicated and expensive gateways to establish the Internet Protocol ("IP") connectivity. In the early days of the IOT, Ethernet, the primary physical connectivity medium, required expensive and power hungry hardware. The software stacks to implement IP were large and complicated and not easily ported to hardware systems unless the hardware included significant processing power and memory. Many of those IP stacks required an advanced operating system that further drove the hardware complexity. Over the last few years, micro computing and memory technologies have advanced to the point where the full operating systems can be ported to very small and cost effective platforms. Some of the new single-chip micro computing platforms that have been introduced over the last five years are powerful enough to include an IP stack, real-time operating system and sensor management to support an advanced smart device.

Advances in the various physical layer communication devices and technologies have also encouraged the deployment of connected devices. For example, Wi-Fi is a wireless local area network ("WLAN") computer networking technology that allows electronic devices to connect directly to the Internet thru a Wi-Fi wireless access point ("WAP"). Wi-Fi networks typically operate using low power transmitters on unlicensed spectrum at either 2.4 GHz or 5 GHz. The specifications for Wi-Fi networks are based upon IEEE 802.11 standards. Although the name "IOT" infers a connection to the Internet, in many cases the connection is using a medium and technology that may using "Internet Protocol" [IP] but may not have direct connection or access to the public Internet. The reasons for selecting a different connection type are many and may include the perceived security of an isolated network.

As the network of connected devices expands the critical nature of the information carried to and from these connected devices expands. Some of the information may be critical because it carries command and control messages that may create undesired affects on the users. Mismanagement of industrial control systems ("ICS"), which include supervisory control and data acquisition ("SCADA") systems, distributed control systems ("DCS") and smaller control systems including programmable logic controllers ("PLC") in the industrial control sectors can lead to significant challenges. ICSs are typically used in industries such as electric, water, oil, gas and transportation, as well as manufacturing sectors such as chemical, pharmaceutical, pulp, paper, food and beverages. The threats and vulnerabilities to these systems are widely recognized. For example, errant control of wastewater management systems can lead to significant environmental damage. Another example might be a traffic signal control network in a metropolitan area. Mismanagement of the control and synchronization of stop lights on a roadway can increase travel times, increase fuel usage, add to air pollution and raise tempers. On a more simplistic level, mismanagement of a water sprinkler control system can wreck havoc with an individual's landscaping, but on a broader scale, it can cause massive water shortages in a region if a significant number of systems were activated simultaneously.

The above examples highlight industrial command and control systems, but equally important are simple domestic remote monitoring and control systems for home management that operate on the Internet. A thermostat that monitors household temperature and is controlled by human presence could publish the thermostat status to a "cloud" server. A home security alarm system could publish the armed/disarmed status to a "cloud" server. Both systems could lead to significant vulnerabilities if that information becomes available to local criminals.

Any time data travels from a machine-to-machine device, computer, smart phone, tablet or similar user operated device, over an accessible medium, whether it is wireless, wired or optical or any other usable and accessible medium, the data is subject to vulnerabilities and threats from unwanted parties. New security solutions must be able to secure the data, regardless of the source and the destination or the medium used to carry the data. Unencrypted data transmission using the wireless wide area networks ("WWAN") using modern CDMA, HSPA or LTE networks is very secure over the air interface. However, some portion of the transmission also traverses a wired IP network where the unencrypted data is vulnerable.

Mobile applications on smart phones or tablets are a significant user of mobile data, and many, if not most use the public WWAN networks for data communications. In reality, the air interface of the WWAN turns out to be the most secure medium carrying the data traffic from the device to the application servers. The WWAN air interface is far more secure that Wi-Fi for carrying application traffic. Unfortunately, the "last mile" from the tower to the device is only a small part of the path carrying the data.

It is becoming customary to use Public Key Infrastructure ("PKI") cryptography methods such as Transport Layer Security [TLS] to secure consumer data between consumer devices and the application servers. Unfortunately TLS using standard PKI methods only solves part of the security problem. The desire of modern data security systems is to insure confidentiality, authenticity, and integrity. Without going into all the possible system vulnerabilities, it should be obvious to most that security weaknesses are discovered almost every day with existing data security techniques.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts in a simplified form as a prelude to the more detailed description that is presented later.

Aspects disclosed herein address, inter alia, WWAN devices connected using 4G Long Term Evolution ("LTE"), and 2G and 3G Global System for Mobile Communications ("GSM") networks or other networks that use an identity module, such as a Subscriber Identity Module ("SIM") card, for subscriber authentication and authorization of the communication channel. Discussion of an aspect relates to establishing, operating, and maintaining a secure end-to-end application data session on mobile wireless devices that rely on GSM/UMTS, LTE or CDMA for the wireless portion of the transmission, or other devices using similar operating methods, wired or wireless, which devices include a Subscriber Identity Module ("SIM"), Universal Subscriber Identity Module ("USIM") or similar identity module with an integrated circuit chip that is intended to securely store an international mobile subscriber identity ("IMSI") and its related security keys which are used to identify and authenticate subscribers on a mobile telephony device (such as mobile phones, smart phones, tablets, computers, wireless hotspots and IoT devices that connect thru the WWAN), where said identification and authentication is conventionally for identifying and authenticating the mobile devices to available wireless networks and the devices' home network operator(s) for the purpose of communication identity, access, billing management, and privileges. Generally, for purpose of discussing aspects disclosed herein, the terms identity module and SIM generally refers to 3G or 4G implementations of a SIM, typically known in the wireless device industry as a USIM. In addition, the terms identity module and SIM may refer to any physical or logical implementation of the aspects disclosed herein, whether the aspects use physically independent hardware (i.e., separate from an identity module) or are virtually or remotely (with respect to a given wireless communication device) implemented within another device, regardless of whether the aspects are referred to as SIM, eSIM, USIM, CSIM, or any other current, or future, designation.

This disclosure presents aspects that use a SIM card, SIM card technology, and SIM card techniques to operate an extremely secure end-to-end data session over-and-above authentication of a wireless device to a wireless network, using secondary security information (use of the term secondary here means in comparison to the primary securing of authentication operations between a wireless device's identity module and a wireless network for purposes of authenticating the device/identity module), over and above the existing WWAN air-interface encryption technology, but additionally adding confidentiality, authenticity, and integrity from the wireless device to an end device, regardless of whether the end device is a server or another user device. Aspects disclosed herein can provide data security between the single device containing the SIM card to multiple endpoints wherein security credentials are unique for each endpoint, and wherein no other endpoint has the capability of decrypting unintended communications.

Aspects disclosed herein use newly-added functionality and capability of a SIM card for TLS security (or similar symmetric encryption/decryption secure data session technology), thereby bypassing cumbersome PKI methods and related potential security flaws. The aspects disclosed herein use a wireless identity module, or SIM card, which typically has excess storage space, to store secret application-related information and to perform a SIM card security algorithm, to generate a set of data which is used as a "Pre-Shared Key" input to a TLS cryptographic protocol known as TLS-PSK (including TLS-PSK cipher suites that include Perfect Forward Secrecy ("PFS").

Novel aspects disclosed herein preclude the need to share pre-shared keys for use in a data communication session, thus largely preventing pre-shared keys used for TLS, or similar, secure communication sessions from becoming known, thus preventing TLS communications from being compromised, and thus minimizing, or eliminating, the need to change the TLS key known by both ends of a communications circuit, which has heretofore been typically difficult with mobile wireless devices.

BRIEF DESCRIPTION OF DRAWINGS

FIG. 20 illustrates new data stored in the SIM card to support application security. This same data is mirrored in a PSK Key Generator storage in the application service platform in the network.

FIG. 21 illustrates how TLS keying material is generated for a TLS-PSK secure connection.

DETAILED DESCRIPTION

Figure 1:
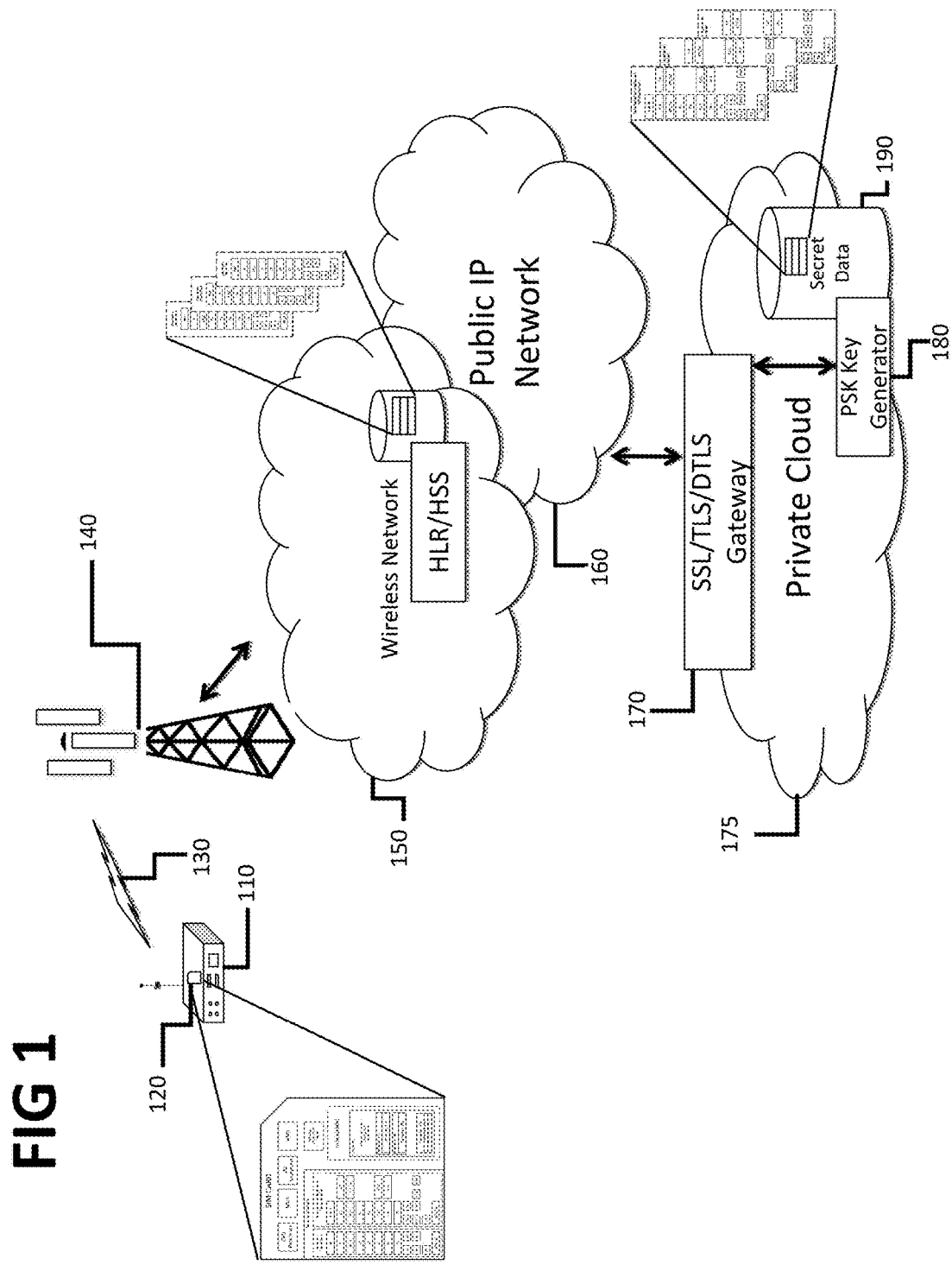
FIG. 1 illustrates a system view of an environment that includes a cellular-connected device, a wireless network with standard wireless security, a secure back office infrastructure implementing SSL/TLS or DTLS security protocols, and a PSK generation system.

As a preliminary matter, it will be readily understood by those persons skilled in the art that the present invention is susceptible of broad utility and application. Many methods, aspects, embodiments, and adaptations of the present invention other than those herein described, as well as many variations, modifications, and equivalent arrangements, will be apparent from, or reasonably suggested by, the substance or scope of the present invention.

Accordingly, while the present invention has been described herein in detail in relation to preferred embodiments and aspects, it is to be understood that this disclosure is only illustrative and exemplary of the present invention and is made merely for the purposes of providing a full and enabling disclosure of the invention. The following disclosure is not intended nor is to be construed to limit the present invention or otherwise exclude any such other embodiments, adaptations, variations, modifications and equivalent arrangements, the present invention being limited only by the claims appended hereto and the equivalents thereof.

In the world of data communications, public-key cryptography ("PKI") refers to a set of cryptographic algorithms that are based on mathematical equations that currently have no efficient solution—particularly those inherent in certain integer factorization, discrete logarithm, and elliptic curve relationships. Public-key cryptography more generally refers to a cryptographic method that uses asymmetric cryptography, an encryption and decryption set of algorithms that utilize a key-pair with one key used for encryption and an associated key used for decryption. The key pair allows one key to encrypt and only the complementary, associated key to decrypt. Specifically, the key used for encryption cannot be used for decryption, and vice-versa. Almost all algorithms allow either key to encrypt or decrypt, but the specific key that is used to encrypt cannot be the same used to decrypt. Most generally, one key is identified as the private key and remains a secret to all but the key pair owner/issuer, and the other key is the public key and may be known to everyone.

From a computational perspective, it is relatively easy to generate public and private key pairs since those need to be generated very rarely and as long as the private key remains secure the key pair can be reused for months or years. The strength of PKI cryptography lies in the computational impossibility, or impracticality, of determining the private key from knowledge of its corresponding public key. Thus the public key may be published without compromising the security of the communications. In operation, the holder of a public key may encrypt a message and broadcast that message, but only the holder of the associated private key may decrypt that message. Furthermore, the holder of a private key may use a special signing algorithm on a message using the private key to generate a signature. The public key can be used with a special signature-verifying algorithm to insure the authenticity of a signature. Although this appears useless since the public key is possibly known by everyone, any receiving party, or receiving device, can determine that the message is genuine if the associated public key does, in fact, confirm the authenticity of the message. This is known as signing the message. Message security depends on keeping the private-key private.

Asymmetric encryption, as described above is computationally intensive. Asymmetric encryption also requires long encryption keys to ensure security. Because of the computational complexity of asymmetric encryption, it is typically only used for short messages such as used for the transfer of a secondary encryption key, typically a symmetric key. Because of the computational complexity of asymmetric encryption, longer messages use a simpler and less computationally demanding symmetric encryption algorithm for actual payload of a data session. Symmetric encryption uses the same key for encryption and decryption.

In operation, PKI cryptography establishes a data session and uses the asymmetric key algorithms to secure the communications channel for the exchange of additional data to authenticate one or both ends and one or more secret symmetric keys between the parties to be used with symmetric key algorithms. To authenticate the identity of the first party, the private key is used to provide a digital signature to the second party. The public key of the first party is signed by a known and trusted certificate authority ("CA") using the CA's own private key. The second party relies on the trust of the validity of the CA's public key, usually preloaded in his system. If the second party is able to successfully authenticate the first party's digital signature, then the first party must be authentic. The process will sometimes include the reverse process where the first party authenticates the second party. Once all authentications are complete, one or more secret keys are exchanged between the parties. Once the keys are exchanged, the security algorithm is switched at both ends simultaneously to a symmetric key algorithm and a secure encrypted data session is established.

The methods of PKI cryptography are slow and very computationally intensive for both ends of the communication channel. Although the methods provide a reasonable level of security, there are many missing pieces. For example, typically TLS using PKI cryptography is used to secure a connection between a well-known first party (for example a bank) and a second party that is unknown to the first party (for example a new customer). Because server (or first party) certificates usually expire after a few years, a human user is expected to authorize the session to continue the first time, or the first time after a renewal. Usually the user (or second party) does not have a certificate certifying his own identification for a site/server (or first party) and would likely not have his own certificates for all sites. Certificates are generally large and with today's devices, are manually loaded for each site.

For devices that are part of the machine-to-machine ("M2M") world, PKI cryptography has another challenge. Unless the device has a powerful processor with ample program execution and temporary storage, the PKI algorithms are a significant burden. Getting certificates loaded into permanent storage on each device is an additional challenge that adds a burden to the PKI system requirements. Many of the M2M devices don't have significant user interfaces or human operators that allow certificates to be managed. The low computing power and memory limited processors used by M2M devices are referred to as constrained devices and because of the storage and processing limitations, constrained devices don't operate well in a PKI world. Most M2M devices use custom protocols at the application level and they operate as a system with a specific server designed to handle the custom protocol and services of the device. Since most M2M devices operate in this "closed" environment, it is not necessary to connect an anonymous device to an anonymous and unknown server. It is generally the case for the system operators on the server side of M2M systems (i.e., a private IP network, such as an enterprise network, or such as a vehicle telematics environment that includes devices in vehicles that communicate with a back end telematics server) to have prior knowledge of devices that will operate on their system.

Fortunately for the constrained device world (i.e., wireless device world), with the above noted considerations, TLS supports a technology that offers solutions to most of the challenges of encryption, authentication, and integrity. TLS has a ciphersuite mode called Pre-Shared Key, or ("PSK") for short. PSK uses a pre-shared key with symmetric cryptography methods along with existing cipher and message authentication code algorithms to secure a data communications channel. By using aspects disclosed herein, it is not necessary for a secure application data session to start with another data session using an asymmetric key to exchange the symmetric key to be used during the actual application data session. The pre-shared key, known to both the first party (server) and the second party (client) allow for a very secure session without the processor intensive mathematical computations and possible insecurities of the PKI session setup.

Figure 12:
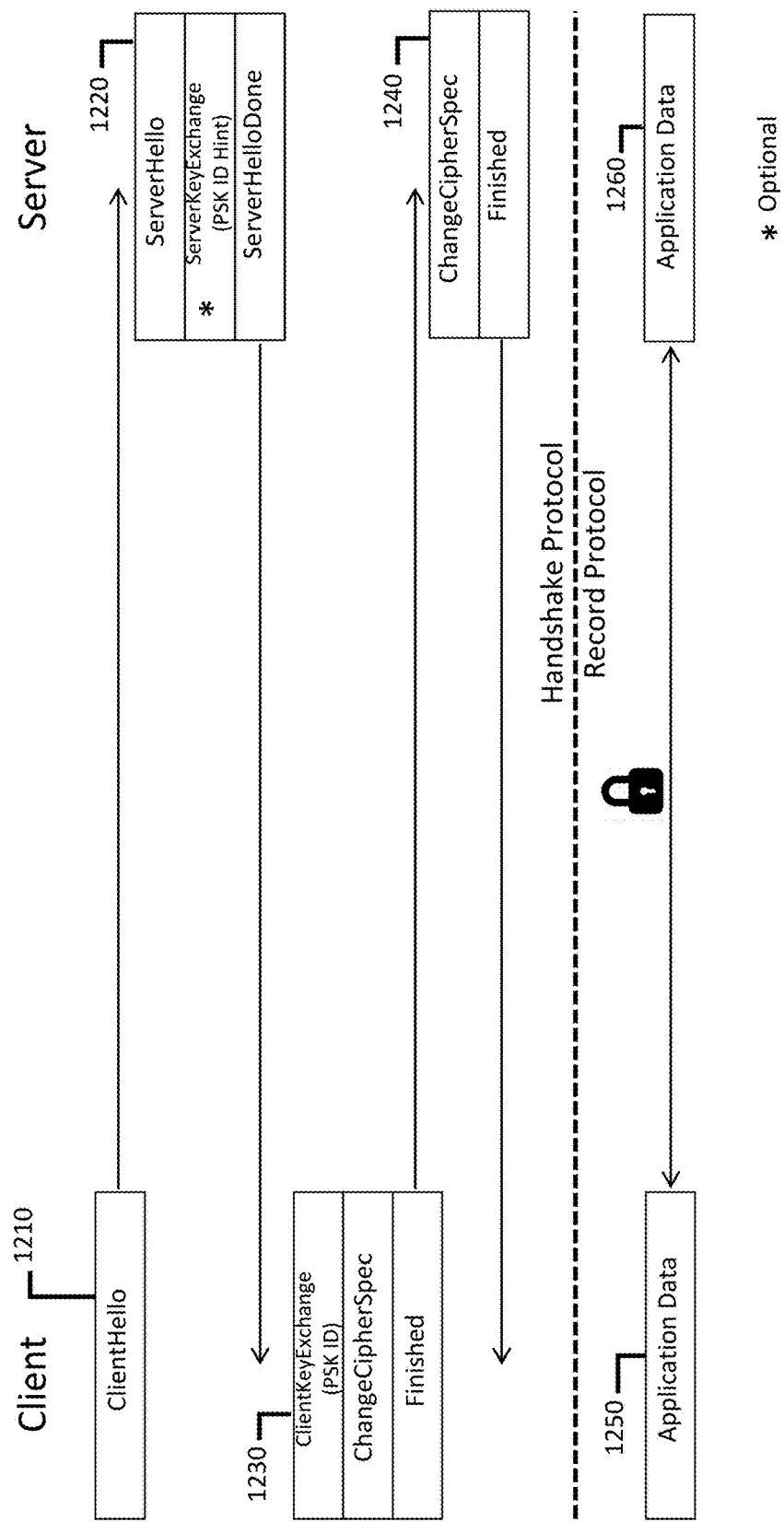
FIG. 12 illustrates a handshake protocol for a TLS-PSK secure connection.

FIG. 12 illustrates a typical TLS-PSK session handshake. The client initiates communications at 1210 to the target server. The client device indicates its willingness to use pre-shared key authentication by including one or more PSK ciphersuites in a ClientHello message. At 1220, the TLS server indicates its acceptance of the use of pre-shared keys, it selects one of the PSK ciphersuites and places the selected ciphersuite in the ServerHello message and it includes the appropriate ServerKeyExchange message. Since basic TLS-PSK does not use certificates, the Certificate and the CertificateRequest payloads for PKI based ciphersuites are omitted from the response saving significant communications time and data usage. Since clients and servers may have PSKs with several different parties, it is possible, but optional, for the server to include a "PSK identity hint" in the ServerKeyExchange message to help the client in selecting which identity to use. If no hint is provided, the entire ServerKeyExchange message is omitted, again saving time and data usage.

At 1230, the client receives the messages sent by the server and forwards the client "PSK identity" to the server. Lastly, the message sequence at 1230 includes a ChangeCipherSpec and that the TLS handshake is authenticated by including a Finished message. At 1240, if the server accepts the PSK identity, it too sends a ChangeCipherSpec and a Finished message. At 1250 and 1260 Application Data is passed between the client and the server.

TLS-PSK, by itself, has a few weaknesses and for normal computer data sessions, one of the major weaknesses is that of "forward secrecy". Forward secrecy is an issue and challenge only if the pre-shared key is later compromised. If communications are recorded and a pre-shared key becomes known, it is possible to decrypt all previous communications that used that specific pre-shared key. This may not be a significant problem for many IoT device applications because the access to repetitive, control and "current status" data may be useless if it become visible weeks or months after the fact. The IoT device remains secure for practical purposes as long as the current accessibility and visibility is blocked.

The lack of forward secrecy also plagues some of the other TLS methods and some of the predecessor Secure Socket Layer ("SSL") methods as well. The industry standards bodies and researchers have been hard at work developing solutions to this problem (and others) and as a result, they've standardized PSK ciphersuites that eliminate the forward secrecy problem and deliver Perfect Forward Secrecy or ("PFS"). Essentially PFS is a characteristic, which can be summarized as: actual encryption is done with a key that does not remain (i.e., it's ephemeral: lasting for a very short time) and is thus immune to ulterior theft. These advanced PSK ciphersuites use a Diffie-Hellman algorithm or an Elliptic Curve Cryptography key exchange method to generate a transient key pair. Unfortunately these ciphersuites are more computationally demanding and will significantly tax constrained processors (such as may be found in wireless, IoT devices). The advantages of all the PSK ciphersuites over methods not including a PSK are that they provide a simple, mutual authentication solution to the application.

Diffie-Hellman key exchange, Elliptic Curve Cryptography key exchange, and Rivest/Shamir/Adleman ("RSA") key exchange are all specific methods of securely exchanging cryptographic keys over public channels. Diffie-Hellman key exchange ("DHKE") sometimes referred to as EDH or DHE is used to provide forward secrecy in TLS's ephemeral modes. The original DHKE method does not provide authentication of the communicating parties and by itself is thus vulnerable to man-in-the-middle attacks. U.S. Pat. No. 4,200,770 describes the original DHKE as a cryptographic system that transmits a computationally secure cryptogram over an insecure communication channel without prearrangement of a cipher key. Essentially DHKE provides enciphered communication between arbitrary pairs of systems without the necessity of the systems agreeing on an enciphering key beforehand.

RSA involves a public key and a private key. The public key can be known by everyone or every device and is used for encrypting messages. The intention is that messages encrypted with the public key can only be decrypted in a reasonable amount of time using the private key. To enable a second party to send encrypted messages, a public key must be sent reliably (but not necessarily secretly) from the first party to the second party. In a public-key cryptosystem, each user (or perhaps only the first party) places an enciphering key in a public file. The user secures and protects the deciphering key as a secret. Once distributed, the public key can be reused over and over by many parties to secure communication channels with the first party. Public key cryptography can reliably verify the identify of a user (or first party) via the digital signatures that are created from the digital certificates that are stored in the public as long as the root of trust traces back to the aforementioned trusted certificate authority. No transactions similar to the above DHKE to exchange secret key are required to initiate private communication. The only setup is that each user who wishes to receive private communications must place his enciphering key in a public file. The RSA communication methods are described in U.S. Pat. No. 4,405,829.

An additional special relationship between encryption and decryption keys exists with RSA. PKI solutions operate when the following relationships exist:

1) Decrypting message M' that was encrypted using Encryption key A requires Decryption key A and the result is message M
2) Decrypting message M' that was encrypted using Decryption key A requires Encryption key A and the result is message M.
3) Decrypting message M' that was encrypted using Encryption key B requires Decryption key B and the result is message M
4) Decrypting message M' that was encrypted using Decryption key B requires Encryption key B and the result is message M The encryption key and the decryption key can be used interchangeably to encrypt a message and if the encryption key is used to encrypt a message; only the decryption key can decrypt the message. If the decryption key is used to encrypt a message, only the encryption key can decrypt the message.

Although each of the above methods used for key exchange may facilitate relatively secure key exchange each has been shown to have certain vulnerabilities, especially with shorter key lengths or flawed random number generators with RSA, or with shorter primes used by DHKE. Various algorithm attacks have demonstrated that some of the popular choices for the above data lengths may be cracked by someone with sufficient budget and resources. To avoid these vulnerabilities, experts today recommend the use of elliptic curve cryptography ("ECC"), which has no known instances of cracking. Supposed benefits of ECC include smaller key size, reduced storage and transmission requirements, which are especially critical in IoT and constrained processor implementations. For example a 256-bit ECC public key should provide comparable security to a 3072-bit RSA public key for asymmetric encryption operations. However, some are skeptical of the security robustness of ECC.

Considering the possible weaknesses associated with the various asymmetric encryption methods used for the key exchange algorithm, the symmetric encryption methods used for bulk encryption of data are significantly stronger when used with an AES quality of algorithm. Even if a symmetric cipher is currently unbreakable by exploiting structural weaknesses in its algorithm, it is possible to run through the entire space of keys in what is known as a brute force attack. With a key length of n bits, there are $2^n$ possible keys. This number grows significantly as n increases. The large number of operations for a 128 bit key is $2^{128}$ operations, which is widely considered out of reach of brute force attacks by conventional digital computing techniques for the near term. In the future, quantum computing may bring the attacks down to a more manageable time and the need for more bits could accelerate. Encryption experts generally agree that when using symmetric encryption with an AES-quality algorithm, 128 bits of security offers adequate security thru about 2030; 192 bits offers long term protection and 256 bit of security should be secure for the foreseeable future.

Almost all recently-discovered security vulnerabilities are a result of cracking the asymmetric key encryption used for the symmetric key exchange process (i.e., authentication and session set-up), while the symmetric key algorithms used for encryption of actual data communications remain secure. Exploiting the structural weaknesses in the encryption algorithm used for the "symmetric key exchange" has been the root cause of almost all, if not all, known past TLS security vulnerabilities.

Inventing a data security system and method is not typically undertaken by the faint-of-heart, or by any one individual. It typically takes a community to develop, to refine, and to fully vet a new data security method and system. For an organization to design a security algorithm and hold the details secret won't garner trust among a community of potential users. A data security solution must be fully vetted and accepted by the data security research community. Security by obscurity is not actually security at all. The exact method and algorithm details must be fully published, challenged by the security research community and mathematicians, and the best solutions will have full source code implementations published for all to examine. However, aspects disclosed herein circumvent these challenges.

Transport Layer Security pre-shared key ciphersuites (i.e., TLS/PSK) are a set of cryptographic protocols that provide secure communication between endpoints based on PSKs. These pre-shared keys are symmetric keys shared in advance among the communicating parties. Using pre-shared keys can, depending on the ciphersuite, avoid the need for public key operations. This is especially useful if TLS is used in performance-constrained devices where processing power and memory might be limited. There are fundamentally three different ciphersuites; the first uses symmetric key operations for encryption and authentication. The second set uses the aforementioned Diffie-Hellman key exchange authenticated with a pre-shared key. The third set combines public key authentication of the server using RSA and certificates along with mutual authentication of the client using a PSK. The second ciphersuite creates a solution that provides Perfect Forward Secrecy. As previously mentioned, these ciphersuites have advantages but also bring the burden of the requirement for significant processing resources both on the server side as well as the client side, which burden is a limiting factor for constrained devices.

Part of all TLS cipher suite implementations is a stream or block cipher that depends upon the previously mentioned symmetric key. It is this stream or block cipher that ultimately carries data securely between the endpoints. As previously mentioned, there are symmetric key ciphers that have been thoroughly vetted thru years of testing, mathematical analysis, and academic research. Although there have been new implementations, some of the algorithms have aged very well where the same cannot be said for the Handshake Protocol that is used to set up the secure communication channel of the Record Protocol, and specifically the process used to exchange the symmetric key.

The most used symmetric key algorithm at the time of this disclosure is the Advanced Encryption Standard ("AES") otherwise know as Rijndael. This standard is a specification for the encryption of electronic data established by the United States National Institute of Standards ("NIST") and Technology in 2001. It is based on the Rijndael cipher developed by two Belgian cryptographers, Joan Daemen and Vincent Rijmen. The Rijndael cipher is actually a family of ciphers with different key and block sizes. NIST actually selected three different members of the Rijndael family, with block sizes of 128 bits and key lengths of 128, 192 and 256 bits.

AES has been adopted by the U.S Government and is now used worldwide. It supersedes the Data Encryption Standard ("DES"), which was published in 1977. The announcement to adopt by the United States followed a five-year standardization process where fifteen competing designs were presented and evaluated. AES became the first publicly accessible and open cipher approved by the National Security Agency ("NSA") for top-secret information.

As soon as the standard was released, researchers began working to develop a practical attack. For cryptographers, a practical attack is anything faster than a brute force attack. A brute force attack is the process of performing one trial decryption for each possible key. Although AES has been extensively studied for nearly sixteen years, at the time of preparing this disclosure, no publicly revealed successful attacks on AES have been performed and noted. The most successful attack yielded a small gain, the equivalent of using a 126-bit key instead of 128-bits and it would still take billions of years of brute force calculations based on current and foreseeable future hardware. At the time of this disclosure, there are no known practical attacks that would allow anyone to read and understand correctly implemented AES encrypted data.

In view of the foregoing, a secure data security solution can easily integrate with existing TLS standard ciphersuites if it avoids using public key operations. At the time of this disclosure, TLS/PSK ciphersuites are significantly secure when used with AES or a similarly secure block or stream cipher. A risk, as previously discussed, is that without PFS, once a PSK has been discovered, all previous communications, if recorded may now be decrypted. Additionally, without secondary key operations of DHKE, or ECC or similar, there is no way to securely transfer a new AES PSK to a remote client if the PSK has been compromised. It should be clearly understood that in PSK operations, security is dependent upon a secure side channel to deliver (i.e., share) the PSK with endpoints that are to become endpoints of a secure data session. If the secure side channel remains secure, the main channel will remain secure. If the main channel is compromised, without PFS techniques, it is impossible to update the PSK over the main channel without the risk that the new PSK will become compromised. Accordingly, this disclosure describes novel aspects of a system and method to, without sharing a preshared key (PSK) to, or between, endpoints, securely update a PSK used at endpoints of a session to securely transport data communication systems that use pre-shared keys as the primary method of securing the communication channel.

Identity modules, such as SIM cards, are integrated circuit cards or chips that are actually special purpose, portable memory and processor chips. The SIM card is intended to securely store the international mobile subscriber identity ("IMSI") and its related key, which is used to identify and authenticate subscribers on wireless networks. From a physical perspective, SIM cards are sometimes removable and sometimes permanently affixed to their associated wireless device platform. In the case of consumer devices, having a removable SIM allows a user's 'personality' and additional SIM contents to be easily transferred between devices, such as smart phones, tablets, handsets, and similar devices. Besides storing a user's personality, SIM cards have been used to store customer contacts lists. Although SIM cards identify and authenticate the subscriber to a wireless network, they only provide identification and authentication of a device they are associated with to a wireless network. Functionality of the SIM includes the capability to generate encryption keys, but these encryption keys are used solely to encrypt the "air interface," that is the communication link between the wireless device and the cell tower. Encryption, and thus security, facilitated by a conventional SIM, does not extend between the cell tower and any other network element or device, whether it is between subscribers or between a subscriber (the device) and a network based application server. Additionally, the SIM card does not validate that the specific network to which the device is communicating is a specific network. A current SIM card only validates, thru associated side communication channels, that the card is authorized to communicate on the network by virtue of the fundamentals of inter-network roaming standards.

The wireless authentication methods are used principally for access to the operator Radio Access Network ("RAN") but they have been adapted to generate the access credentials for Wi-Fi wireless access. Those methods are discussed in two different documents published and generally available. They are "Request For Comment 4186" ("RFC4186"), titled "Extensible Authentication Protocol for Global System for Mobile Communications ("GSM") Subscriber Identity Module ("EAP-SIM") and "Request For Comment 4187" ("RFC4187") titled "Extensible Authentication Protocol Method for $3^{rd}$ Generation Authentication and Key Agreement" ("EAP-AKA"). These documents discuss methods to 'credentialize' devices that already have SIM cards but have a need to access additional transport resources (specifically Wi-Fi) without having an additional credential storage and management system outside of the SIM card and the operator's Authentication Center ("AuC"). The methods described in EAP-SIM and EAP-AKA specifically use secret information that has been stored by, or on behalf of, the wireless operator specifically for wireless network access, authentication, and encryption. Sharing those credentials could present a weakness to the wireless operator's security methods and, the methods described by EAP-SIM and EAP-AKA require specific network equipment tie-in to access information stored in the authentication center, while requiring access to the operator's control plane signaling environment.

There have been attempts, such as "ETSI TS 133 220" "Generic Authentication Architecture; Generic Bootstrapping Architecture" ("GAA/GBA"), to use standardized and existing secret information and SIM card capabilities, but each of these attempts has focused on using the specific data already stored in a wireless network authentication algorithm input memory portion of a SIM card by or on behalf of a wireless network operator for storing network authentication inputs, and the functionality relied solely on a connection to the network operator's Authentication Center and invasive connections to the wireless operator's network by third parties. In contrast, aspects disclosed herein are operationally different, use new and different secret material stored in an application authentication algorithm input memory portion for storing inputs for application security, which are unrelated to the wireless operator's secret material, process the new application security inputs using different mechanisms, and specifically are designed for regular and ongoing PSK generation for applications unrelated to basic wireless transport. It is important to note that the GAA/GBA methods rely on a secret that is created and shared in advance specifically for the purpose of mobile network access credentialization, authentication, and security, whereas aspects disclosed herein use secret data created and adapted specifically for the purpose of application credentialization, authentication, and security and use a different security architecture designed specifically for application security without compromising wireless network security.

IOT devices don't necessarily need removable "personality" modules. In many cases, having a removable SIM could be a security vulnerability by itself. IOT devices also don't necessarily need the additional storage used for phone books and contact lists. As a result, SIM cards in IOT devices contain excess memory storage capacity that may go unused in typical IOT applications.

A typical SIM card contains methods that protect data within the device in which it is installed. Although technicians sometimes "de-cap" integrated circuit chips to evaluate chip failures, it is also possible to reverse engineer an integrated circuit by taking a photomicrograph of a chip with the plastic encapsulation removed. A photomicrograph is a photograph or digital image taken through a microscope or similar device to show a magnified image of an item, in this case, the integrated circuit silicon die. One skilled in the art of integrated circuit design, technology, and manufacturing processes used in the field of integrated circuits can reverse engineer and recover firmware bits or other soft configuration values stored in integrated circuits. Sometimes it requires a scanning electron microscope or transmission electron microscope. The state of the art in IC reverse engineering can be best understood through a white paper published on the Internet by Randy Torrance and Dick James of Chipworks Inc. This paper, "The State-of-the-Art in IC Reverse Engineering" explains techniques that can be used to reverse engineer an integrated circuit. See, www.iacr.org/archive/ches2009/57470361/57470361.pdf.

A SIM card is a special integrated circuit constructed using unique manufacturing techniques that cannot be easily reverse engineered by the traditional "de-cap" reverse engineering techniques. Eliminating the possibility of this method of reverse engineering could eliminate one level of security risk, but as mentioned above, security by obscurity isn't security at all. SIM cards are constructed using technologies such that data stored on them is destroyed during an attempted "de-cap" process.

Notwithstanding the physical methods used to protect SIM cards, additional methods are used to offer the necessary security for subscriber identification and authentication. With modern SIM operation techniques, successfully compromising a specific SIM only yields enough to compromise one wireless subscriber account. While it may become evident to the attackers what information, including unique subscriber keys, was present in the SIM prior to the attack, current techniques destroy the device in the process, rendering the process nearly useless for system level attacks.

From a software perspective, SIM cards have methods that protect the secure contents from direct examination. Although certain information is directly readable from the outside of the SIM by manipulating control signals on SIM cards, certain information is protected thru internal hardware and software mechanisms to prevent direct data extraction. For example, a SIM card usually contains an ICCID and/or IMSI. These values are usually either directly readable or they are only protected using simple personal identification number ("PIN"). Similarly, only a PIN may protect phone books and contact lists. However, security encryption algorithm portions and memory portions that store inputs to the algorithm portion are typically not accessible from outside the SIM, and are not changeable—the algorithm inputs are stored when the SIM is manufactured.

The mathematical security of cryptographic algorithms used by cellular networks as well as the detailed methods of managing them has changed as GSM has evolved from 2G to 4G networks. In the 2G SIMs, network operators could use a standard algorithm such as COMP-128 (also know as the A3/A5/A8 algorithms), or a completely custom algorithm, to authenticate GSM, generate session keys, and to encrypt the data transmitted over the radio air interface between the mobile station and the base station. Over the years flaws were discovered in the COMP-128 series of algorithms and eventually operators adapted COMP-128 or developed different custom algorithms in attempts to eliminate the weaknesses. As a result of these issues and the shorter key lengths of COMP-128, and the move towards a UMTS/LTE (3G/4G) standard, a new standardized security algorithm was developed. At the time of this disclosure, the standardized 3G/4G algorithm is an AES based MILENAGE algorithm. Another algorithm, TUAK, has been developed and standardized, and is an industry approved alternative to Milenage for security operations. Although Milenage is the subject of the discussion herein, it should be recognized by those skilled in the art that Milenage is but an example security algorithm and any algorithm, whether it is one of the older weaker algorithms, or any new or different algorithm, including TUAK can be utilized as an authentication algorithm processing engine as disclosed herein. It should be recognized that as time goes on, wireless industry algorithms like TUAK deliver progressively more keying material on a single pass and may be utilized without the dual pass shown and described in this disclosure infra.

Each SIM contains subscription details known only to the subscriber's home network. This information is well guarded by the network operator and the information is securely stored in the operator network so that it becomes nearly impossible to extract the secret information directly. On the SIM card, one SIM specific (subscriber specific) value is known as the Authentication key, or the subscriber key, or simply K. Older SIM documents have referred to this value as Ki. At the time of this disclosure, K is a unique 128-bit value that is stored on the SIM and which is also securely stored in the subscriber's home network Authentication Center AuC. Another value usually stored in newer SIMs, but not necessarily unique per subscriber, is the 128-bit Operator Variant Algorithm Configuration Field ("OP").

Figure 2:
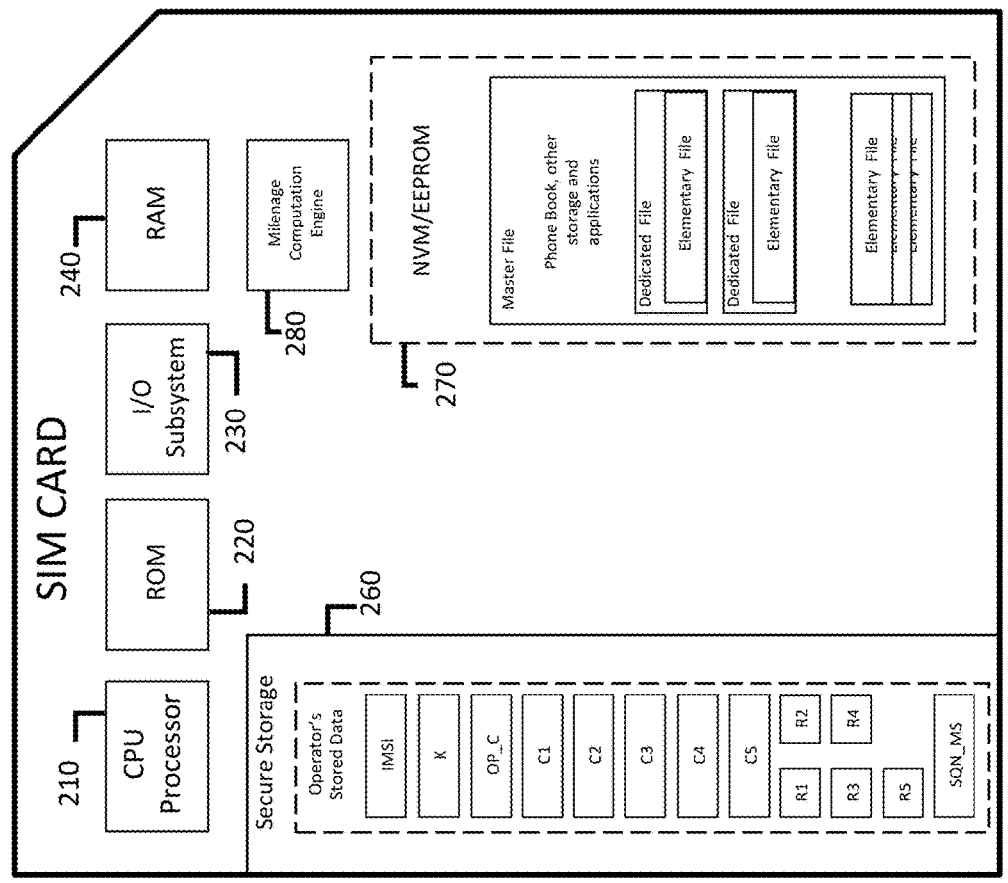
FIG. 2 illustrates conventional wireless network SIM card contents used for identification, authentication, and access management of a wireless device to a long-range wireless network.

FIG. 2 illustrates the typical SIM card architecture. A SIM card is actually a "portable" computing element containing a central processing unit ("CPU") 210, program execution read only memory ("ROM") 220, an I/O interface 230, and random access memory 240. Within the physical device itself, some additional memory, typically implemented with "non-volatile" memory like electronically erasable FLASH memory, contains other storage. Some of this storage, for example shown at 260, may be secured using special methods described later and some of this storage, for example the storage shown at 270, may be traditional electronically erasable memory.

Figure 3:
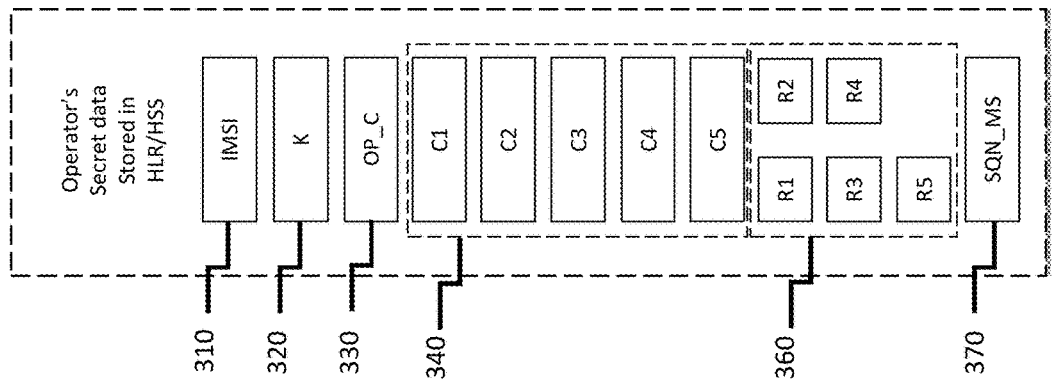
FIG. 3 illustrates typical minimum secret data stored within the secure memory of a SIM card for conventional wireless security management.
Figure 4:
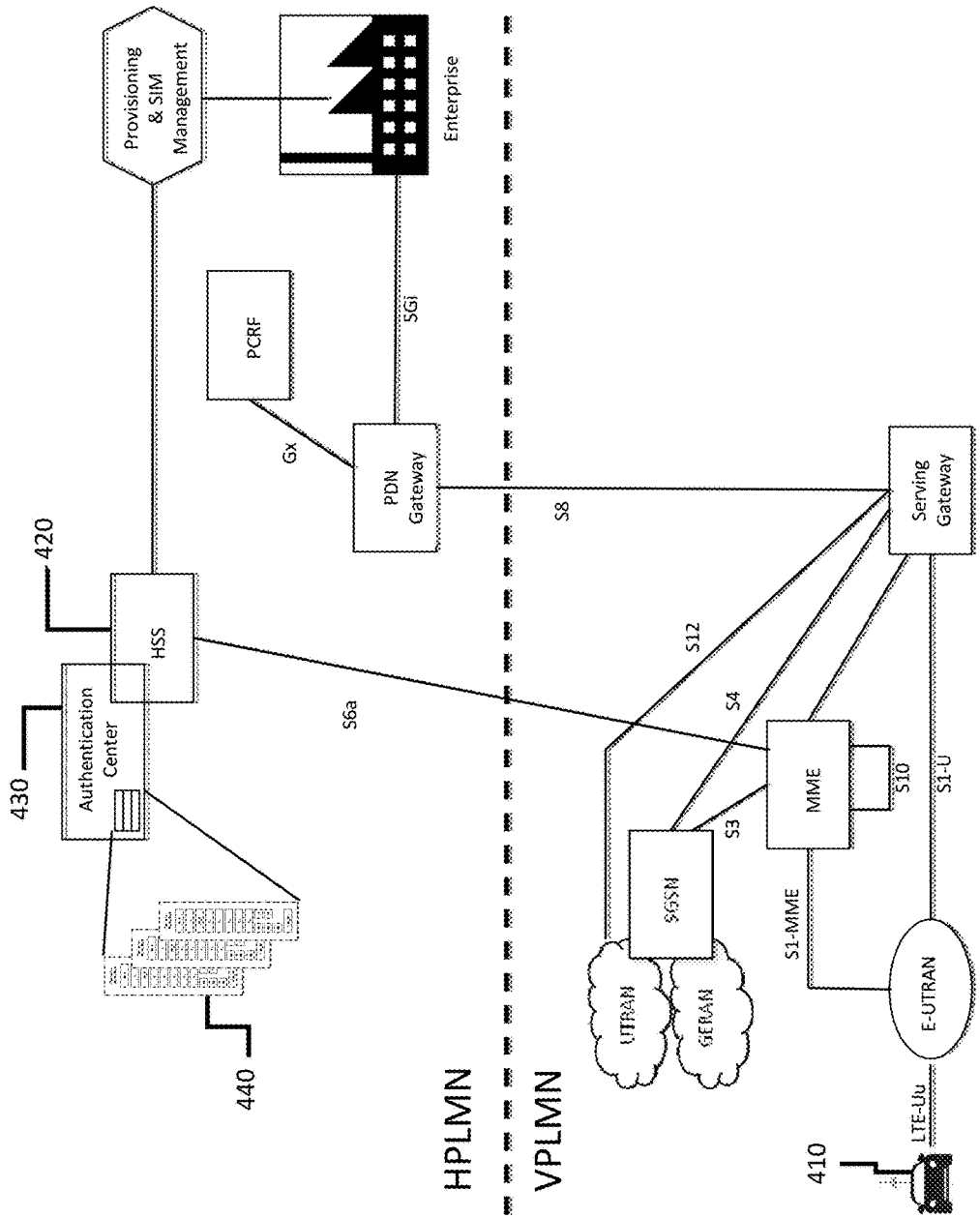
FIG. 4 illustrates a typical wireless network architecture including the Home Subscriber Server ("HSS") and Authentication Center ("AuC") as well as the location of the secret data stored on behalf of the home operator for subscribers. (The AuC may be physically part of the HLR/HSS.)

FIG. 3 illustrates the typical secret contents that are stored in the memory of a conventional SIM card at 260 of FIG. 2 and in the HLR/HSS/Authentication Center at 420/430 shown in FIG. 4. These values, which may be referred to herein as network authentication inputs, which are used as inputs to the Milenage authentication engine 280 shown in FIG. 2, include the International Mobile Subscriber ID ("IMSI") 310, the 128-bit secret subscriber key ("K") 320, a 128-bit Encrypted Operator Variant Algorithm Configuration field OP_C 330, C1-C5, each of which 128-bit constants are shown 340, R1 thru R5, each of which 7-bit constants are shown 360, and 48-bit Mobile Station Sequence Number 370. To be noted is that C1 thru C5, and R1 thru R5 have specific values that may be unique to a given SIM card and are generally considered "constants" in the wireless SIM cards, with similar constant input values (but may be uniquely different from one SIM to the next) being used by every SIM card, or blocks of SIM cards, used in devices on a given operators wireless network. The value in Operator Variant Algorithm Configuration field 330 is either stored as an encrypted value or it is stored unencrypted. Different operators may store the OP value differently. The value stored in OP field 330 may be considered a constant among SIM cards of a block of SIM cards, but may also be variable among SIM cards.

FIG. 4 illustrates the typical 4G wireless network architecture. Generally speaking, a wireless device shown at 410, illustrated as being a telematics device of a vehicle, but which could be a user's smart phone that the user has brought into the vehicle shown in the figure, contains a standard SIM card that provides identification, authentication, and encryption credential information, such as the inputs discussed above in reference to FIG. 3. A corresponding entry in a HLR/HSS as shown at 420 also typically contains the same identification, authentication, and credential information. Alternatively, a separate Authentication Center shown at 430 may securely store identification, authentication, and credential information along with similar identification, authentication, and credential information associated with other SIM cards. The identification, authentication, and credential information is shown at 440 and generally only the HLR/HSS has access to such credentials for use in establishing a secure session with device 410. The identification, authentication, and credential information data are protected using various means including, but not limited to, physical separation from networks that may offer a path for compromising the secure secret data.

Mobile network authentication and mobile device authentication methods can be modified for generating components for PSK-determination used for a TLS-PSK cryptographic session and validating the new key assignment (i.e., handshaking) for an application's session with a remote client, thus providing a complete, end-to-end, data security environment. Newer Milenage computations generate multiple keys, some of which are 128-bits. One key is the Integrity key IK and another key is the Confidentiality key CK.

For AES, a 128-bit high entropy key, for example, generated from truly random bits, is adequate and acceptable for encryption, but may not be optimal given most TLS implementations support up to 256-bit AES encryption. As mentioned previously, a brute force attack is one attack method and performing one trial decryption for each possible key would take billions of years of calculations based on current and foreseeable future hardware. The most successful attack on AES encryption yielded a small gain the equivalent of using a 254-bit key instead of the original 256 bits. As a point of reference a perfect encryption key is one that is merely a bit sequence of given length, each bit of which has been chosen at random uniformly and independently.

TLS typically uses two values, called 'secrets', one called a pre master secret ("PMS") and the other and another called the "master secret". The point of the pre master secret is to have a uniform format to generate the master secret. From the point where the master secret has been generated, TLS is generic. All keying material (i.e., material, or information, used to create a key for symmetric encryption/decryption) is generated from a uniform master secret. TLS supports several kinds of key exchange algorithms and in particular RSA asymmetric encryption, PSK, and various Diffie-Hellman variants all of which yield "shared secrets" (more specifically the components of a pre master secret) of varying size and format. After the master secret is generated, a standard and uniform method is used to generate the encryption key used for the symmetric encryption of the record protocol. It should be noted that while AES is the preferred encryption algorithm because of the time-proven robustness, it is likely that other encryption algorithms will be adopted in the future and this encryption key generated using the disclosed technology would work as well with those encryption algorithms.

With TLS 1.2, for all key exchange methods, the algorithm used to convert the pre master secret into the master secret is specified by the cipher suite. The master secret is typically 48 bytes in length. The length of the pre master secret typically varies depending on a given key exchange method and in the case of PSK, the length of the PSK itself.

```
master_secret = PRF(pre_master_secret, "master secret",
              ClientHello.random + serverHello.random)
[0..47];
```

The entire keyblock is derived as follows:

```
key_block = PRF(SecurityParameters.master_secret,
            "key expansion",
            SecurityParameters.server_random +
            SecurityParameters.client_random);
```

Once enough material is generated and stored in the key_block, the key_block is split into the encryption/decryption keys. Encryption or decryption depends on the direction. The key_block is sequentially split into the arrays:

```
client_write_MAC_secret[SecurityParameters.hash_size]
server_write_MAC_secret[SecurityParameters.hash_size]
client_write_key[SecurityParameters.key_material_length]
server_write_key[SecurityParameters.key_material_length]
client_write_IV[SecurityParameters.IV_size]
server_write_IV[SecurityParameters.IV_size]
``` where PRF is a Pseudorandom function and IV is initialization vector.

For TLS-PSK, the pre master secret is typically formed as follows. If PSK is N bytes long, the pre master secret consists of the 2-byte representation of the integer value of N, N zero bytes, the 2-byte representation of N once again and the PSK itself. (PMS=N∥0 . . . 0∥N∥PSK.) Essentially the pre master secret is typically two times the length of the PSK plus 4 additional bytes. Because the first half of the pre master secret is constant, the entire security of the secret relies on the second half, the PSK itself.

FIG. 21 illustrates the typical method of generating the keying material for a TLS-PSK ciphersuite. In general, as used herein the terminology 'keying material' generally refers to intermediate values calculated at endpoints, or at devices associated with endpoints, that are created in the generation of a preshared key (PSK) as the endpoints. Keying material does not refer to a preshared key that is used to secure the transmission of session data. As noted above, the PSK at 2110 is combined with filler material (all bytes are zero) at 2120 and combined with the random seed data at 2130 and processed with the Pseudorandom function at 2140. A standard 48-byte length "Master Secret" at 2150 is the output of the Pseudorandom function. It should be noted at point 2150 that every TLS session, whether it is TLS-PSK, RSA or Elliptic Curve PKI based TLS ciphersuite is uniform with 48-bytes once the Master Secret is generated.

If using a ciphersuite that includes Diffie-Hellman with PSK, the pre master secret is typically formed as follows. First, perform the Diffie-Hellman computation in the same way as for other Diffie-Hellman-based ciphersuites in TLS. Let Z be the value produced by this computation (with leading zero bytes stripped as in other Diffie-Hellman-based ciphersuites). Concatenate the length of Z (in octets), Z itself, the length of the PSK (in octets), and the PSK itself [PMS=LENz∥Z∥LENpsk∥PSK].

Figure 22:
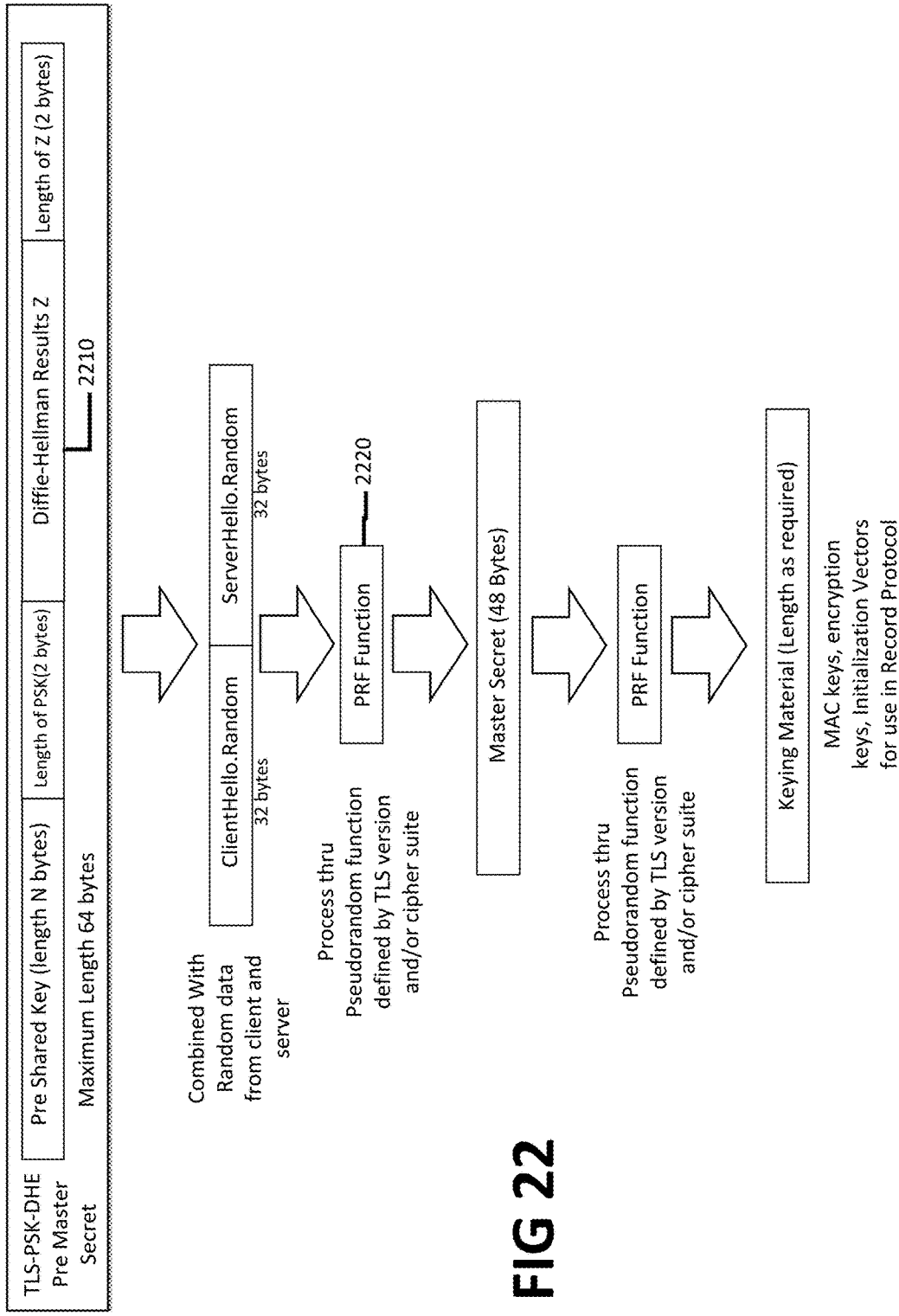
FIG. 22 illustrates one example of TLS keying material being generated for a TLS-PSK secure connection if a system's requirements include "Perfect Forward Secrecy".

FIG. 22 shows a similar ciphersuite, but with a Diffie-Hellman value at 2210 mixed into the pre master secret. Although the length of the pre master secret may vary slightly from the TLS-PSK ciphersuite mentioned above, after the Pseudorandom Function at 2220, the Master Secret is the same length as every other TLS ciphersuite.

If using a ciphersuite that includes RSA w/PSK, the pre master secret field sent from the client to the server contains a 2-byte constant C=48, a 2-byte version number V and a 46-byte random value R encrypted with the server's RSA public key, the length of the PSK (in octets), and the PSK itself. (PMS=C∥V∥R∥LENpsk∥PSK') The pre master secret is thus 52 octets longer than the PSK.

According to the standards, TLS implementations supporting these ciphersuites MUST support arbitrary PSKs up to 64 octets in length. It is therefore desirable to generate a 64 octet (i.e., 512 bit) PSK using the SIM card for maximum effective key size and to minimize the opportunity for a brute force attacks.

If the maximum TLS PSK implementation is desired, there are a number of methods to reasonably deliver the number of unique and mathematically unrelated bits to be used as the PSK. Since a typical requirement of any security algorithm is to be fully published and vetted, varying the organization of the bits of the PSK is not useful for further obscuring the PSK. The effective key size is equal to K plus OP (or OP_C) as long as OP remains a secret. OP can be unique per device for a given SIM card causing the effective key size to be 256 bits. The options are many for generating unique outputs to CK and IK. It is possible to vary the two 128-bit constants c3 and c4 as well as the integers r3 and r4 on a second pass of Milenage to generate a different set of CK and IK. A better solution might be to create a second K and OP and run the Milenage "f3" and "f4" functions a second time with either the same RAND or a completely different RAND sent from the network, generating only the new CK and IK. Additionally, as described above, by creating unique CK and IK values by using non-zero c3 and c4 and different, but carefully chosen, r3 and r4, one can create 512-bit results by concatenating CK and IK from two different runs of Milenage. Each of CK and IK are significantly different and would result in a larger PSK to be used by the standard TLS function. As with K and OP, the values selected for c3 and c4 and r3 and r4 must be kept secret and may also be either constant across all SIMs or they may be selected on a per device basis as long as the peer server supports the storage of the unique values for each client device.

Perfect Forward Secrecy: The PSK and RSA_PSK ciphersuites do not provide Perfect Forward Secrecy. That is, if the shared secret key (in PSK ciphersuites), or both the shared secret key and the RSA private key (in RSA_PSK ciphersuites), is somehow compromised, an attacker can decrypt old conversations.

The DHE_PSK, ECDHE_PSK, or similar ciphersuites provide Perfect Forward Secrecy if a fresh Diffie-Hellman or ECC private key is generated for each handshake.

An environment in which novel aspects disclosed herein may be used is shown in FIG. 1. A wirelessly connected device 110 contains a SIM card, which is revised and improved according to aspects disclosed herein, with new secret data stored within the secure storage section of the physical card itself, inaccessible by any means, either thru software or thru physical means, but available to certain functions, namely the "Milenage Computation Engine," which can provide computation for standard wireless security functions but can also perform computation for newly-defined application network security functions. The new secret data may be referred to herein as application authentication inputs. Device 110 uses the contained SIM card 120 as defined by the wireless specifications applicable to the wireless transport network to establish wireless network security. Once successfully authenticated, registered, attached, and communicating via a wireless network that includes a base station or eNodeB 140 and a packet core network 150, such as an evolved packet core network, using RF link 130, device 110 establishes a TLS session to Gateway 170 thru either the Public IP Network 160 or through any private network that may be coupled with the packet core network.

Preferably, device 110 uses a standard TLS-PSK or a similar TLS-PSK ciphersuite that may include other cipher functions as required, including, but not limited to, ECDHE and/or RSA or similar to identify, authenticate, insure message integrity, and encrypt the communications between device 110 and gateway 170. A PSK-ID is used to identify device 110 to Gateway 170. During establishment of a data session, a decision may be made by gateway 170, device 110, or any other server within the private cloud 175 to update the "working security credentials" of device 110 and of Gateway 170. The parameters that may be used to update the working security credentials (which may be referred to elsewhere herein as a WORKING PSK), and the criteria that may be used to trigger an update, are discussed infra. Once the decision is made to update the credentials, the PSK Generator 180 begins the update process by retrieving the current secret credentials contained in database 190 by using the PSK-ID as the identifier of device 110. A decision to update security credentials for use in securely communicating with a given device 110, or an application running thereon, may be made at each new connection request made by either wireless device 110 or an application server that seeks to query the wireless device.

Figure 5:
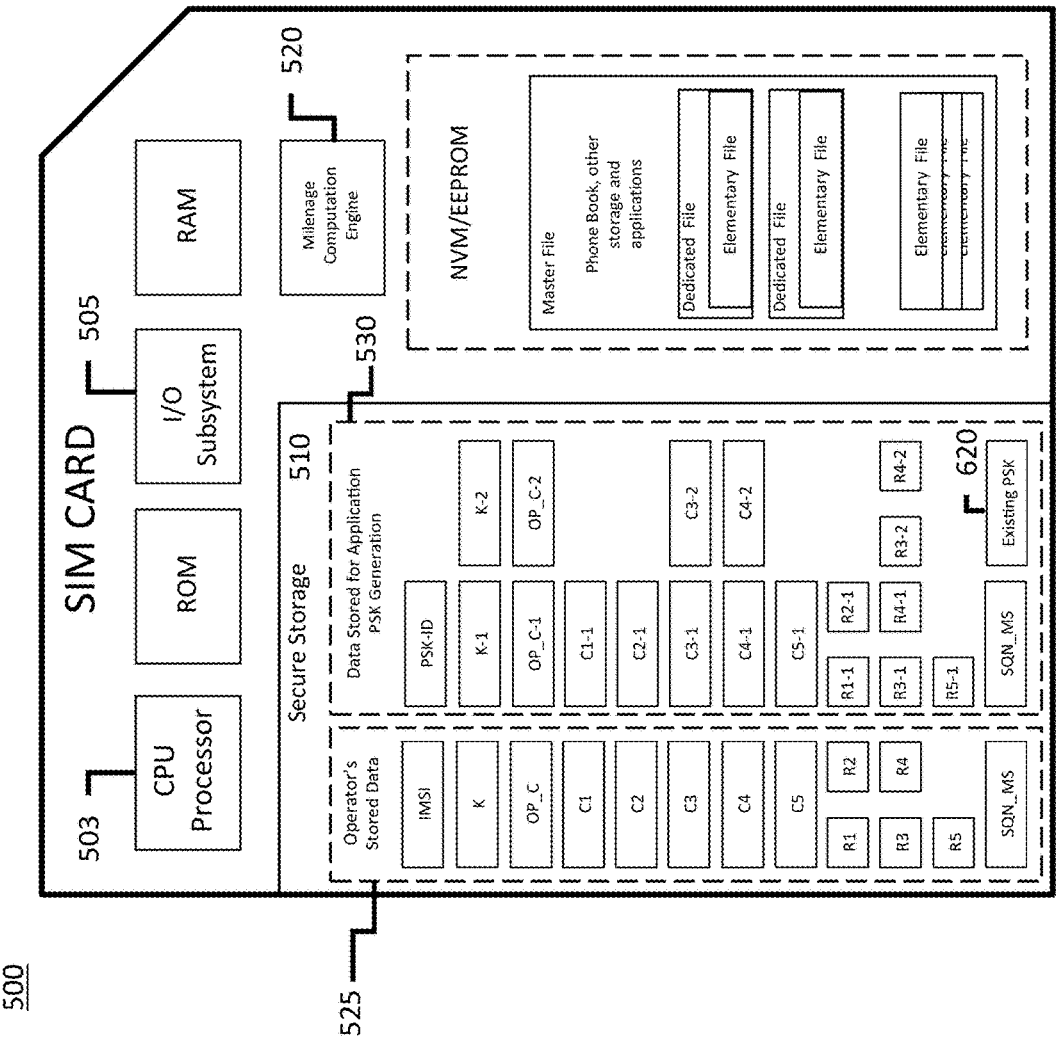
FIG. 5 illustrates new SIM card architecture for performing application authentication. Included are the normal SIM card subsystems and functions as well as the new storage that contains new secret data used for application security and Security Key Generation.
Figure 6:
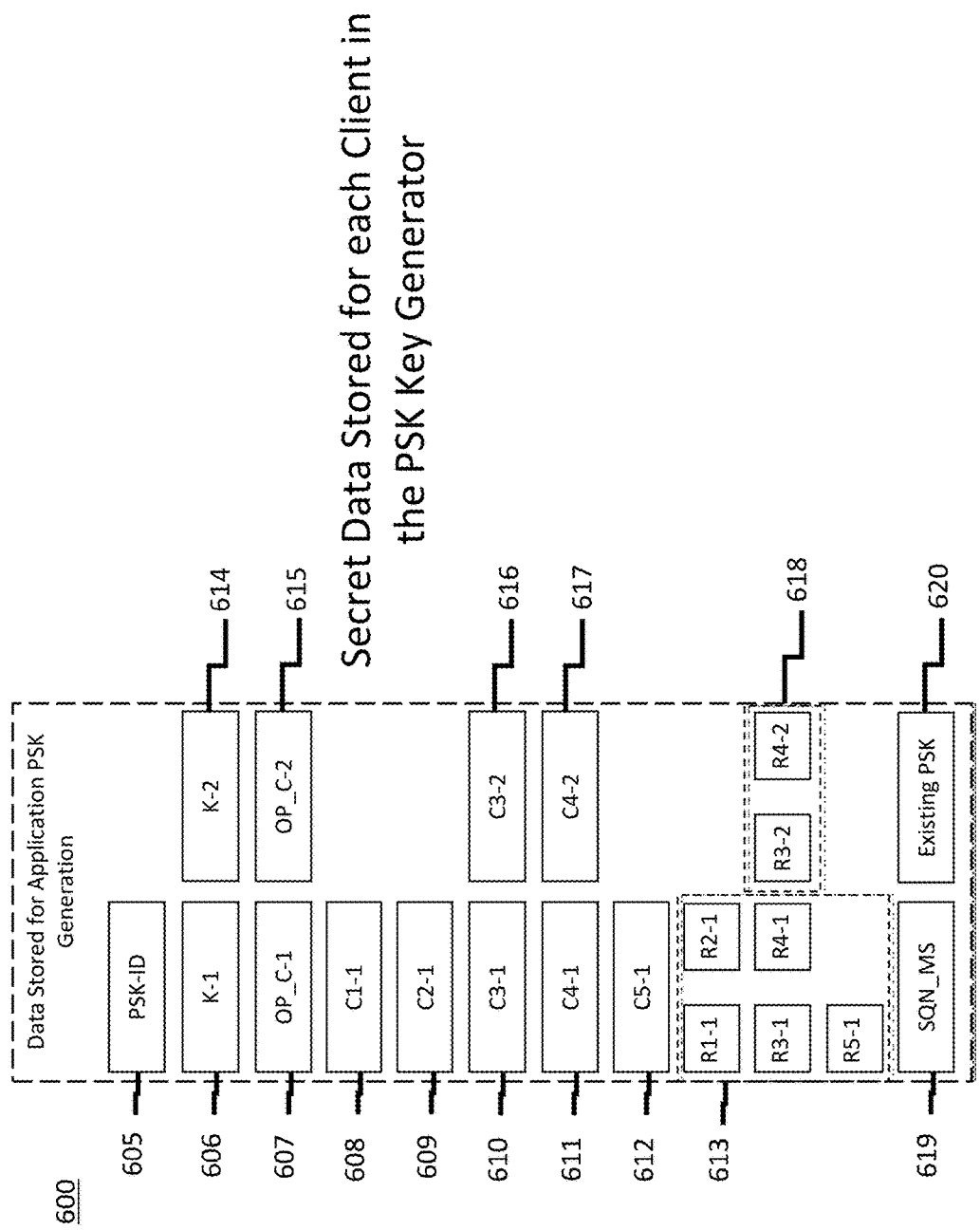
FIG. 6 illustrates the new secret data stored within secure memory of a SIM card for an aspect of the disclosed application security.

FIG. 6 illustrates the preferred typical data record stored at application server 190 shown in FIG. 1, for each IoT/wireless device, such as a smart phone, a tablet, a telematics device of a vehicle, a wireless modem coupled to a sensor, etc., registered with the application server, with one record for each of a plurality of devices. The secret information of record 600, which corresponds to data stored for application-PSK-generation shown in block 530 of FIG. 5, differs from conventional secret data used to authenticate the IoT/wireless device to a wireless network, which corresponds to the block "Operator's stored data" shown in block 525 of FIG. 5. The exploded view of secret data from server 190 represents the secret information of record 600 in FIG. 1.

Continuing with discussion of FIG. 6, each exemplary record 600 typically contains the following information: A unique identifier, PSK-ID, is shown at 605, corresponding to the PSK-ID that is transmitted during the "ClientHello" message shown on FIG. 12, at step 1210. Two sets of unique Milenage input parameter values and constants (which may collectively be referred to herein as application authentication inputs) are stored, with each set corresponding to separate passes of the Milenage algorithm of SIM card 500 shown in FIG. 5 to generate the working application PSK. Some of the parameters and/or constants can optionally be stored between each pass and some are unique for each pass. In the preferred embodiment, two sets of secret subscriber keys K, with one subscriber key specified for each of first and second passes of the Milenage computation are stored. These subscriber keys are shown as blocks 606 and 614 in FIG. 6. Blocks 607 and 615 refer to Operator Variant Algorithm Configuration Field values that may be stored for each pass. FIG. 6 shows OP_C referring to the Operator Variant version, which is encrypted off board, but the Operator Variant may be encrypted onboard since it is encrypted with K values 606 and 614. Since the Operator Variant is only used as an encrypted value, it is possible to encrypt the original OP before storing OP_C into database 190 shown in FIG. 1 and before storing on a SIM card. Alternatively, this OP value could be stored unencrypted and subsequently encrypted in the key generator shown at 180 of FIG. 1 and in SIM card 500 shown at FIG. 5 immediately prior to use.

FIG. 6 shows a number of other variables and/or parameters (i.e., application authentication inputs) that may be either unique per each Milenage algorithm pass or may be common between the passes. (These one or more application/data session passes of Milenage are distinct from a pass that may be used to authenticate a wireless device to a wireless network.) It should be recognized that using unique application authentication input parameters for each pass of Milenage is an aspect that is not substantially different from an aspect that uses shared parameters between the first and second pass of Milenage. Since SIM card storage space, database storage space, and communication bandwidth are not affected either way, having the additional set, or sets, of application authentication input secret data is not a burden on the system operation (i.e., operation of SIM card 120 and gateway 170, and interaction between the two when a device 110 containing the SIM card seeks to authenticate an application to, and to generate a PSK for symmetric encryption of data packets with, a server of private network 175 as shown in FIG. 1). A preferred aspect uses unique sets of values for each pass of Milenage and with each first and second pass value set being typically unique values stored in, and associated at a PSKKeyGen with, each SIM card, which provides security among devices.

FIG. 6 shows five Milenage application authentication input constants C1-C5, shown at 608, 609, 610, 611, and 612, as well as input integers R1-R 5 shown at 613 for pass 1 and constants C3 and C4 shown at 616 and 617 as well as integers R3 and R4 shown at 618 for pass 2. Since constants C1, C2, and C5 as well as integers R1, R2, and R5 are not contributors to the actual outputs of CK and IK, and are only used for authentication, there is little value storing and associating a second set of values for them across different passes. It makes sense to use the same values in SIM 500 for different Milenage passes, but values for all C and R values may be used for each Milenage pass as long as database 190 stores all the values for each unique SIM card. Changing what data is shared is not material to operation of the disclosed aspects, and what is defined above as shared or is only illustrative and exemplary of the disclosed aspects. One skilled in the art of should recognize that even the K values could be shared if a different RAND is used for each pass, or a single RAND could be used by each pass as long as the K values were different. The more difference between the Milenage input constants and parameters the more secure the algorithm, as long as all the constants and parameters remain a secure secret known, or possessed, only by a SIM 120 and database 190 shown in FIG. 1.

FIG. 5 shows a representative SIM architectural view of the disclosed SIM card 500. As compared to FIG. 2, FIG. 5 includes the additional application authentication inputs 530, which are also shown as inputs 600 in FIG. 6, stored on SIM card 500 in Secure Storage 510. The PSK-ID is accessible by the CPU 503 and can be transferred to I/O subsystem 505 directly, but is not modifiable by the CPU. The K, OP_C (or OP if stored unencrypted), C-constants, and R-integers are readable only by the Milenage Computation Engine 520 and in normal operation they are never modified (typically they cannot be modified). The Secure Storage is only accessible by the Milenage Computation Engine and cannot be accessed by any application, whether internal or external, using SIM toolkit.

Figure 13:
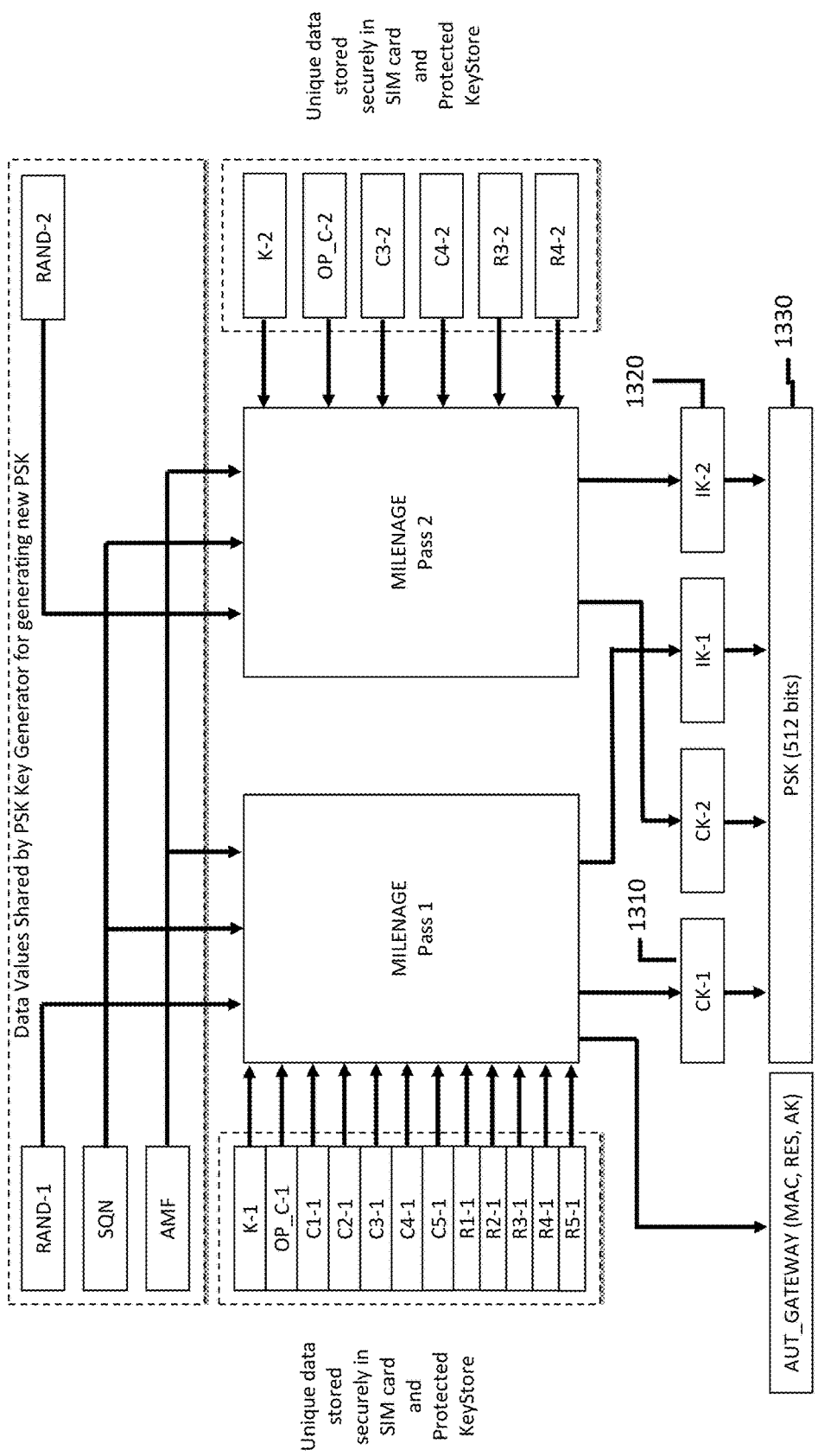
FIG. 13 illustrates a high level process for generating a PSK used by for application security. In this illustration, only the application security secret data and variables are used. Each variable/parameter shown has no relationship to any wireless-operator-defined variables/parameter used for conventional SIM card connectivity security.

FIG. 13 illustrates a high level view of an aspect of variable/input usage and processing for authenticating an application running on a wireless user device to an application server and for generating pre master secret and master secret data for use in separately generating symmetric PSKs at SIM 120 and PSK Key Generator 180, shown in FIG. 1, for secure communication there between. When a secure endpoint, or node, of FIG. 1, whether it is secure wireless device 110, TLS gateway 170, or PSK Key Generator 180, decides that a new working PSK should be generated, as shown in FIG. 13 PSK Key Generator 180 picks two Random Numbers, RAND-1 and RAND-2 and generates the gateway authentication value, AUT_GATEWAY, that includes a Sequence Number SQN and a value in an Authentication Management Field AMF, and forwards this AUT_GATEWAY value to wireless user device 110 of FIG. 1 and thus to SIM card 120 of the user device where the AUT_GATEWAY and the random numbers are used. Once SIM card 120 receives RAND-1, RAND-2, and AUT_GATEWAY, the SIM card separates out the component parts of AUT_GATEWAY, verifies the MAC, and begins performing new PSK calculation process disclosed herein.

Figure 14:
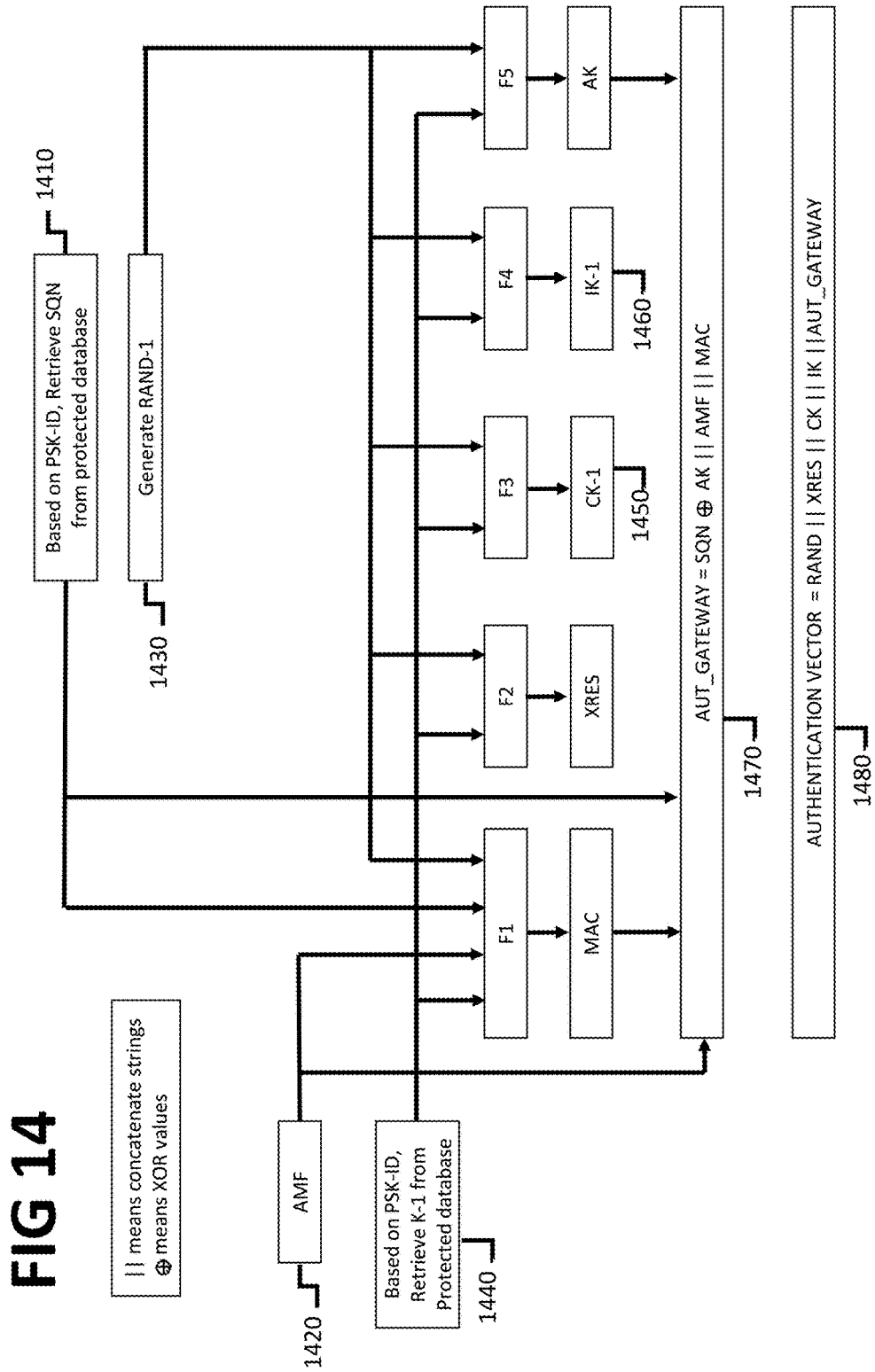
FIG. 14 illustrates, from a network perspective, a first pass of a Milenage algorithm in a SIM identity module for application security and how the data is used to generate variables shown in FIG. 13.
Figure 15:
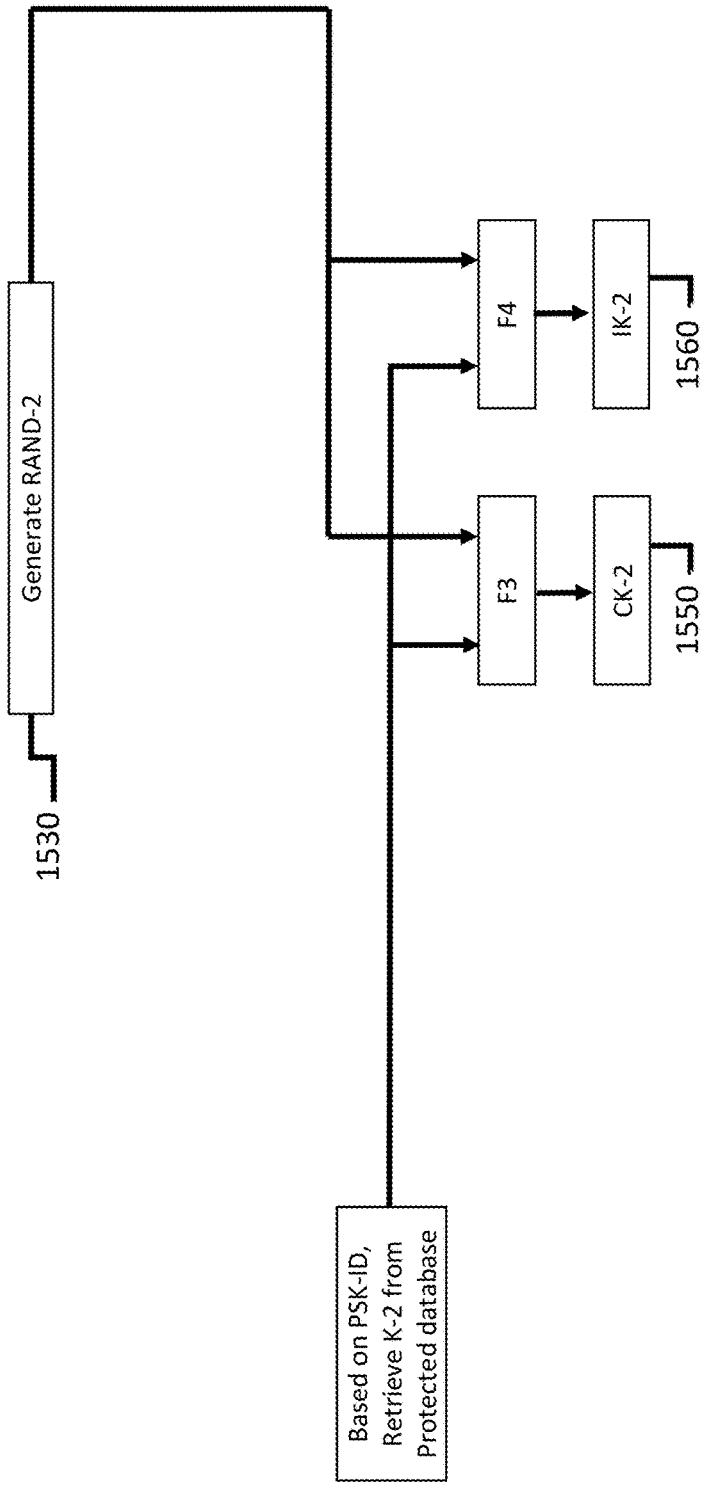
FIG. 15 illustrates, from a network perspective, a second pass of the Milenage algorithm for application security and how the data is used to generate variables shown in FIG. 13.

FIG. 14 illustrates the Milenage function processing performed by the PSK Key Generator 180 on a first pass by a Milenage engine of the PSKKeyGen. Preferably, PSKKeyGen 180 performs two passes of Milenage. FIG. 15 illustrates the shortened Milenage function process performed by the PSKKeyGen 180 on the second pass. As noted in the paragraph above, preferably two different Random Numbers, RAND-1 1430 and RAND-2 1530 are generated, corresponding to the first and second passes of Milenage used for application authentication or generation of data encryption keys. Although two different random numbers are preferred, acceptable security may be provided using a single RAND. The first pass of Milenage, using application authentication inputs 605-613 shown in FIG. 6, from SIM 500 shown in FIG. 5, generates a complete set of Milenage outputs, for the assembly of the AUT_GATEWAY, as well as the other components for authentication of the application running on the remote wireless device, such as device 110 shown in FIG. 1. Expected Result ("XRES"), and the component parts of the PSK, CK-1, and IK-1, are also generated by this first pass of Milenage.

FIG. 15 illustrates a second pass of Milenage using the same Milenage function used in the process shown in FIG. 14. A limited subset of the second pass function is all that is required because the second Milenage pass is used only to generate additional keying material shown on FIG. 13 at 1310 and 1320, which additional keying material contributes to working PSK 1330. In the second pass, the SQN at 1410 is not necessary because it is only a component that contributes to the AUT_GATEWAY at 1470 and the Authentication Vector shown at 1480. The AMF at 1420 is also not required in the second pass as it too is also a function specifically for the AUT_GATEWAY value that is computed as part of the Authentication Vector. The second pass of Milenage only generates the second set of CK-2 1550 and second set of IK-2 1560 because a single instance of the Authentication Vector is all that is required for authentication and validation. Although only limited functions are required for the second pass, a complete second pass and a complete second validation by the SIM and Gateway enhances security compared to only performing a first pass of Milenage.

Figure 16:
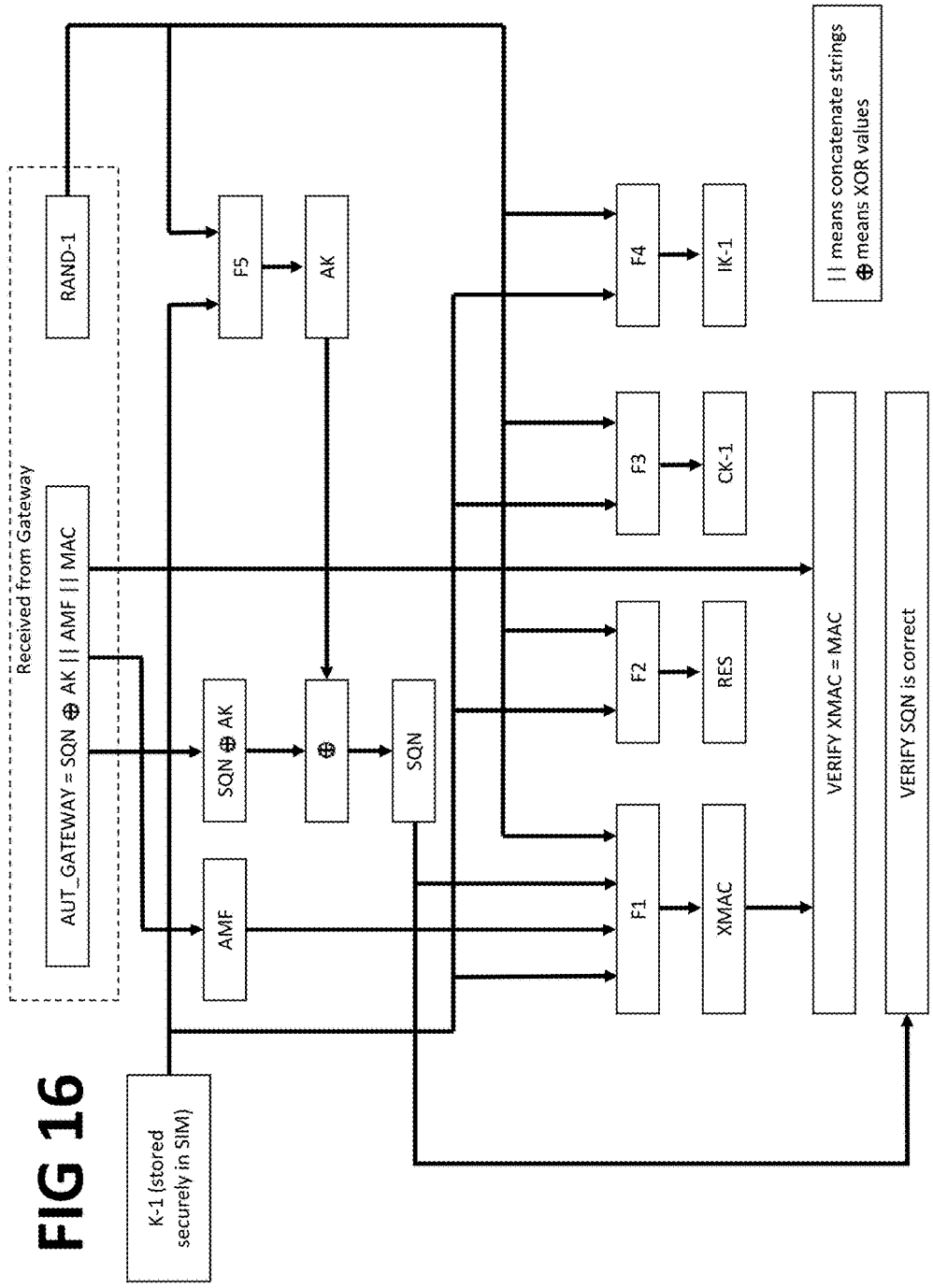
FIG. 16 illustrates, from a Client/SIM card perspective, the first of the two passes of Milenage for application security and how the data is used to generate variables in a client device shown in FIG. 13.
Figure 17:
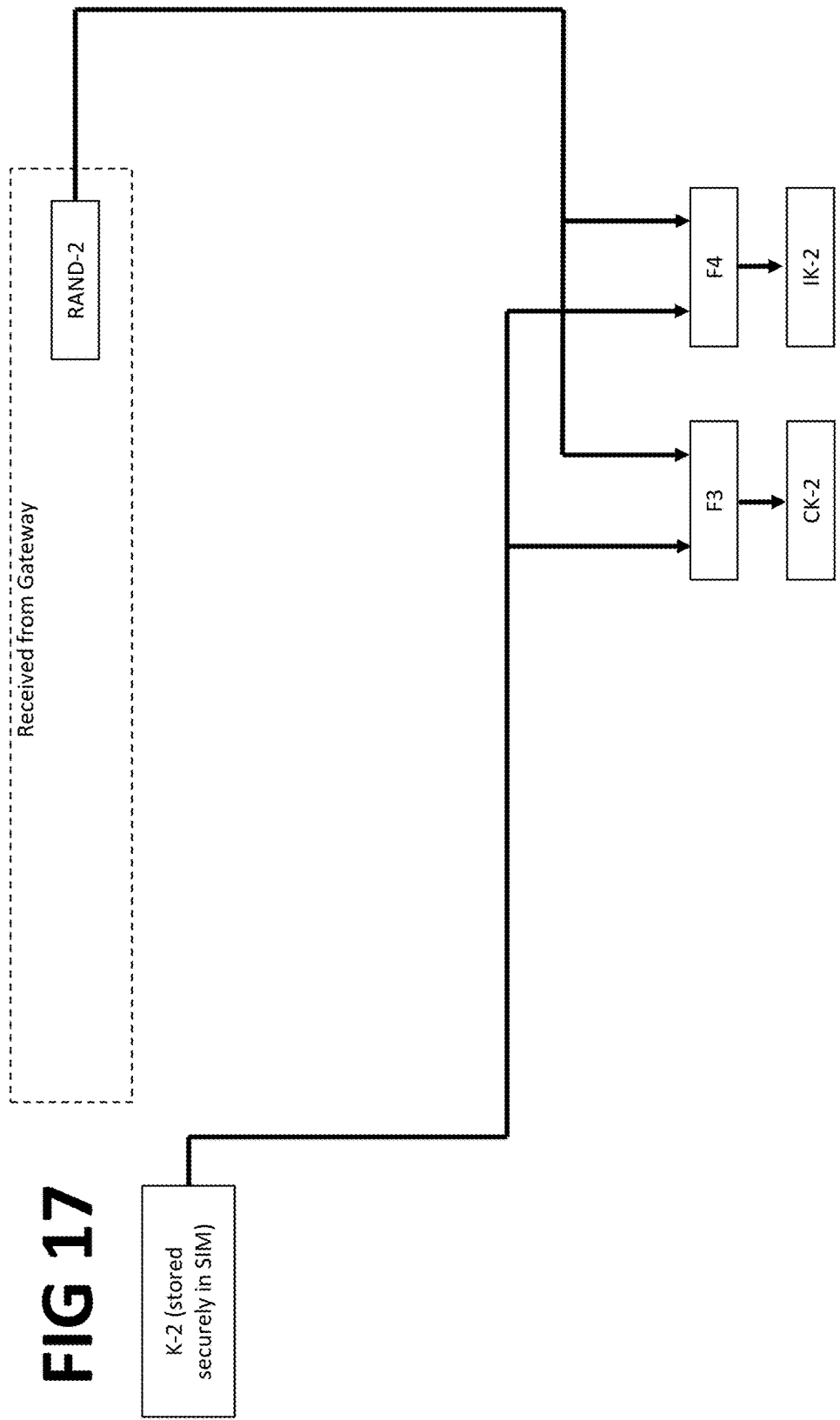
FIG. 17 illustrates, from a Client/SIM card perspective, the second of the two passes of Milenage for application security and how the data is used to generate variables in the client device shown in FIG. 13.
Figure 18:
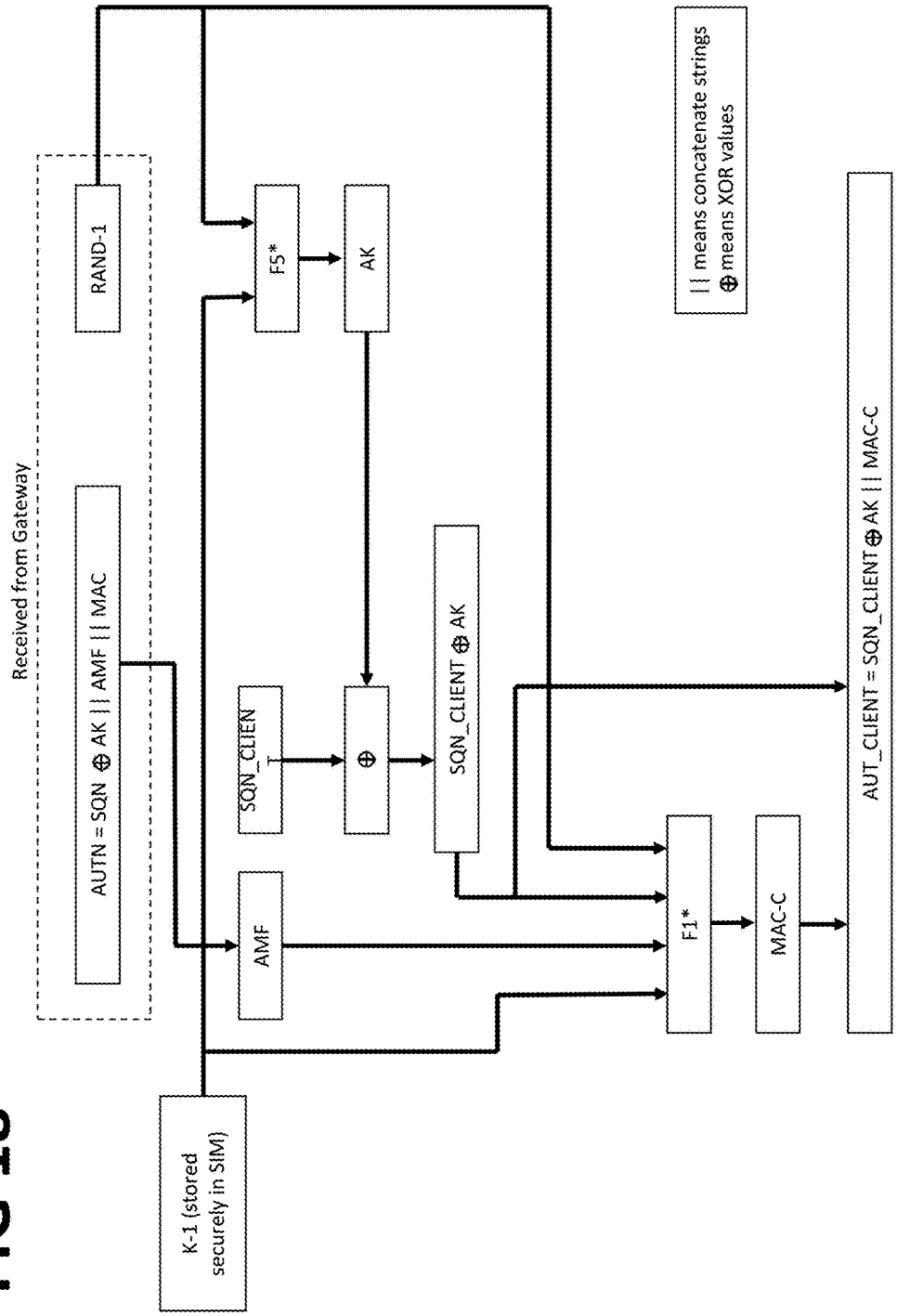
FIG. 18 illustrates, from a Client/SIM card perspective, application security using Milenage for generating PSK keys in the event the "Sequence Number" gets out of sequence.

FIG. 16 and FIG. 17 shows the flow of variable determination at the client node SIM card. As described above, a complete first pass of a Milenage function is completed to verify the MAC and the SQN for use in application authentication (i.e., generation of data encryption keys). If the received MAC does not equal XMAC, then either the SQN may not be correct, which condition typically causes the client node to resynchronize the SQN as shown in FIG. 18, or the network authentication failed because of some other reason. This resynchronization step prevents the client node from being 'tricked' into connecting to an imposter Gateway that is attempting to gain access to, or to take over, the client. As described in the previous paragraph, the second pass of Milenage shown at FIG. 17 is used for the limited purpose of generating additional keying material CK-2 and IK-2.

FIG. 18 illustrates resynchronization to restore the SQN in PSK Key Generator 180 to the same value as in the SIM card. The limited network authentication code for the client MAC-C insures to PSK Key Generator 180 that a genuine device, not an imposter device masquerading as a genuine device using a genuine device's PSK-ID, is attempting to resynchronize. The AUT_CLIENT is sent to the PSKkeyGen and subsequently processed thereby to extract the SQN_CLIENT and correct the database entry associated with the PSK-ID.

Figure 19:
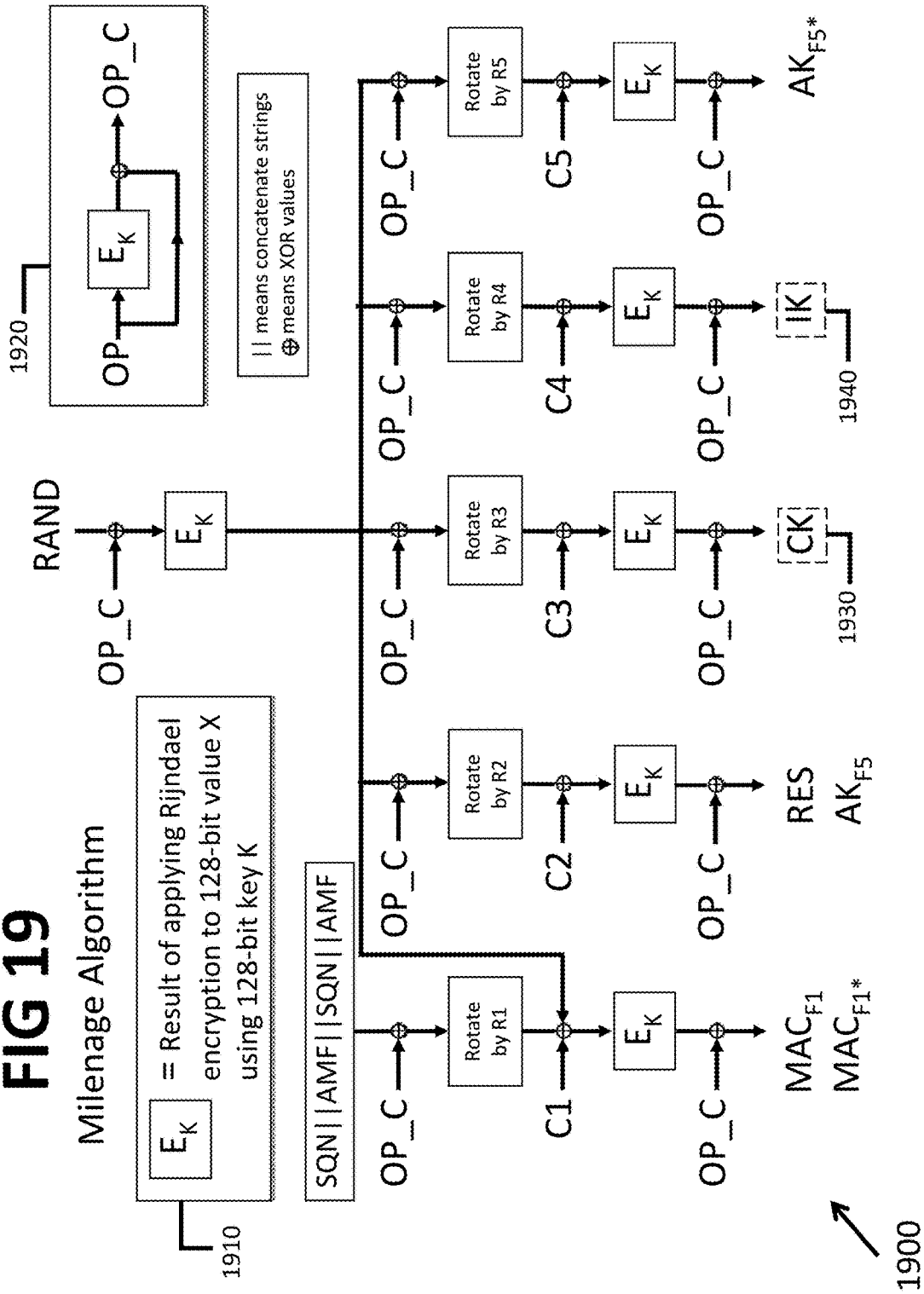
FIG. 19 illustrates a high level view of the Milenage algorithm process.

FIG. 19 illustrates a high level view of a Milenage algorithm and how it operates on various parameters and how it generates various outputs. One important aspect of this drawing is the block marked $E_k$ shown at 1910. This is the well known Rijndael (also known as AES) encryption process using 128-bit keys and operating on a 128-bit block. This encryption is key to the methods used in Milenage. The Rijndael block is a deterministic algorithm in that during two passes of the algorithm, with the same inputs, the same outputs will be generated. Another aspect shown in process 1900 is that only OP_C is used for calculations and OP is never used except to generate OP_C. OP_C is derived from encrypting OP with K, which is another secret value permanently stored in SIM 500. An aspect of this allows OP_C to be generated prior to storing on the SIM card. This protects OP as it does not need to be distributed directly and even with the knowledge of stored K value, it is impossible to reconstruct the value OP. Block 1920 shows the calculation of OP_C. Each of the processes is similar and generally have 128-bits as an input and 128-bits as an output. For Milenage outputs that are less than the full 128-bits, a subset of the output is used. Outputs CK, shown at 1930 and IK, shown at 1940 are generated similarly and one important aspect is that R3 does not equal R4 and C3 does not equal C4. Wise choices for these values are important. It should be recognized that if R3=R4 and C3=C4 then CK and IK would be equal, possibly generating weaker keying material for the final PSK.

FIG. 20 illustrates the typical minimum additional storage as well as the preferred maximum storage in a new-generation SIM card used for application authentication and symmetric PSK generation, and the approximate size of a client record in the PSK Key Generator. As described herein, in an aspect some input values may be the same for the first pass of Milenage and the second pass of Milenage. Therefore the inputs shown in the figure may be different than a scenario where C1, C2, C5, R1, R2, and R5 are different for each first and second Milenage pass.

Figure 7:
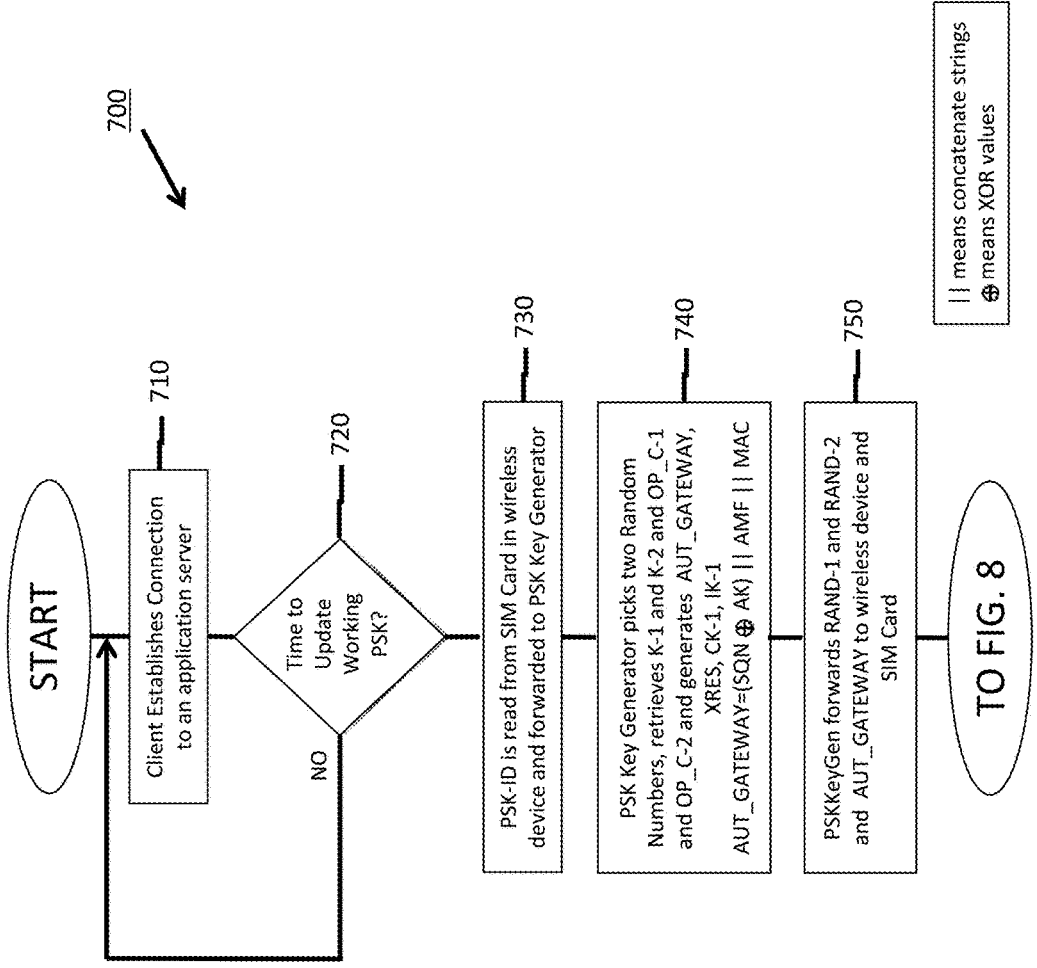
FIGS. 7-11 illustrates a flow diagram of novel steps performed by a PSK Generation System.

FIG. 7 illustrates a flow diagram of method 700 for authenticating a client application running on a wireless device to an application server. At step 710, the client device uses a pre-existing current PSK stored in the wireless device's SIM (as shown in FIG. 20, in FIG. 5, and in FIG. 6 as 'Existing PSK' 620) to establish a communication session to a TLS Gateway, or to some other node, either with or without TLS security. Although typically the client establishes an outgoing connection into a server that 'listens' for a connection request from a device using TLS, the roles could be reversed and a central server could seek to establish a connection to a client application. Furthermore, the connection may be established without security, without having any detrimental effect on future security of data transmitted over the connection. If an endpoint of the communication session, or some other network node, makes a determination at step 720 that the pre-existing current PSK (which may be referred to as 'WORKING PSK') should be updated, a PSK-ID is read from the SIM card in the client device, (typically a wireless device running a client application) at step 730. A criterion to trigger an updating of an existing, current, or working PSK could be based on time, perhaps once per day, per week, or even once per year, or the trigger criterion could be connection based, perhaps as often as every connection or every 10 connections, or even potentially it could be based on a combination of time and connection-based conditions, or the determination that an application device should update its PSK may be based on any other factor determined at either the client or the server endpoint devices. The PSK-ID is not information that a conventional wireless SIM stores for use in authentication of a wireless device to a wireless network. The PSK-ID is forwarded through the already-established wireless data connection to a application server attached to, or associated with, PSK Key Generator 180 shown in FIG. 1, that is typically part of a private network, and that is part of the new application authentication/key generation aspect disclosed herein. After receiving the PSK-ID, at step 740 the PSK-KeyGen picks, or generates, at least one random number RAND-1, and preferably two random numbers, RAND-1 and RAND-2. Based on the PSK-ID, the PSKKeyGen queries its database for Milenage algorithm application authentication inputs K-1, K-2, OP_C-1 and OP_C-2 and other secure values used for generating output data such as shared secret constants (C1-1 through C5-1), rotation integers (R1-1 through R5-1), and a Sequence Number SQN. The application authentication inputs, the other secure values, and the SQN retrieved based on the PSK-ID correspond to, and are typically unique to, the SIM card 600 that has the given PSK-ID stored in block 605 as shown in FIG. 6. (except that the SQN could possibly be the same as a current SQN for another SIM, and it is possible, but unlikely, that the secret data stored on a given SIM and associated therewith at the PSKKeyGen may also happen to be the same secret data stored on another SIM and associated therewith). The application authentication inputs are secret data, unique to a given SIM, that are stored in the given SIM and also stored at a secure data store that only the PSKKey-Gen can access. The terminology 'application authentication inputs' may be used herein to refer not only to the inputs K-1, K-2, OP_C-1, and OP_C-2, but reference to 'application authentication inputs' may also include reference to the constants and rotation integers. The term 'application authentication inputs' may also include reference to SQN. At step 740, the PSKKeyGen executes a first pass of a Milenage algorithm and generates an Expected Result XRES, Confidentiality Key CK-1 and Integrity Key IK-1 and it assembles remote endpoint authentication value AUT_GATEWAY that comprises a plurality of portions containing SQN, AK, AMF, and MAC. The term 'remote' indicates that the endpoint generating the AUT_GATEWAY value is remote from the client device that sent the PSK-ID. It will be appreciated that the component portions SQN, AK, AMF, and MAC are specific values used by, or generated by, a Milenage algorithm, but the remote endpoint authentication value may contain different values, corresponding to different algorithm parameters, than given in this example if authentication algorithm processing engine 520 shown in FIG. 5, performs a different algorithm than Milenage. At step 750, the PSKKeyGen forwards RAND-1, RAND-2 and AUT_GATEWAY to the wireless device and its SIM card.

Figure 8:
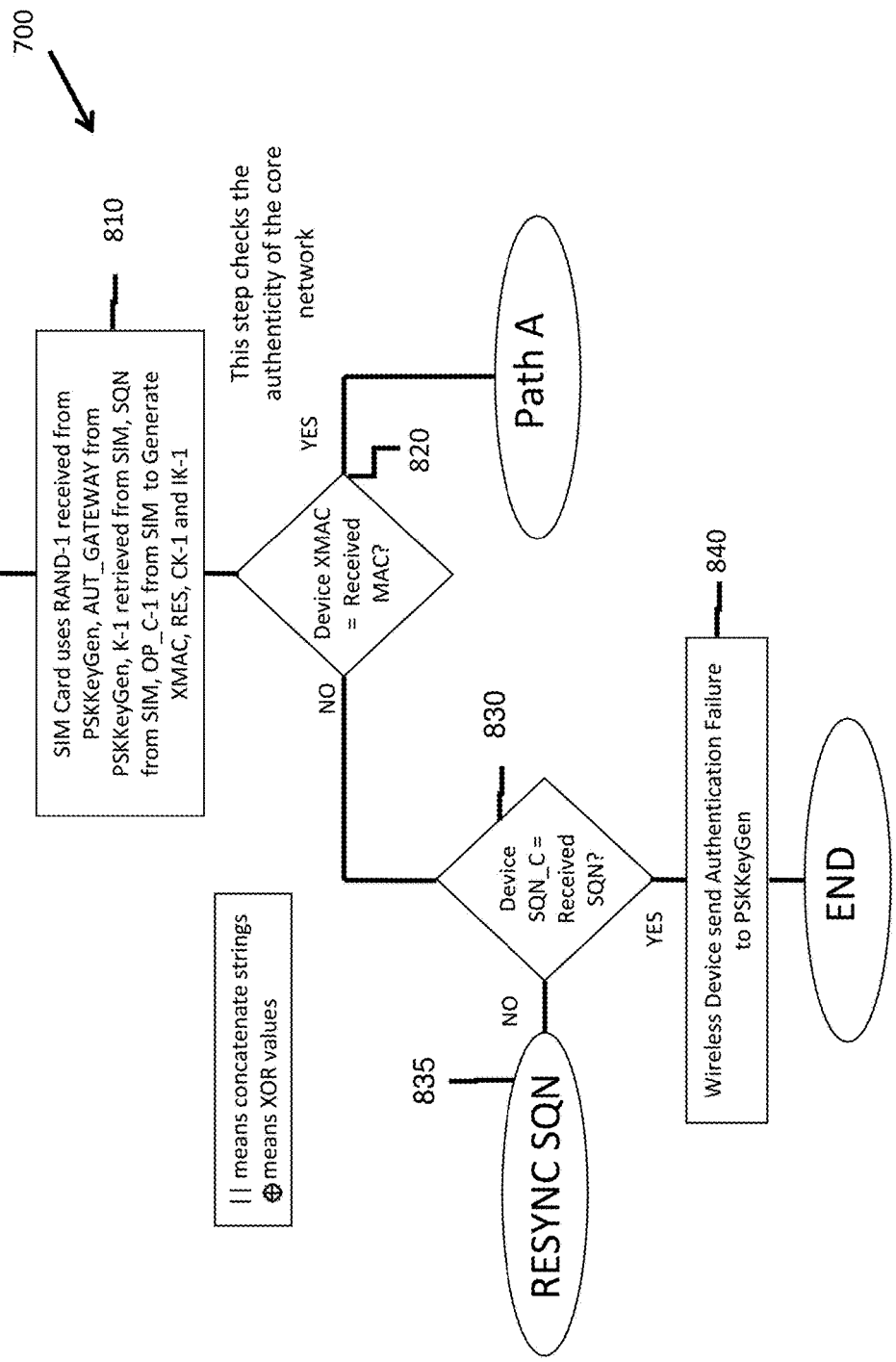

Continuing with the discussion of method 700, which continues on FIG. 8, at step 810 the SIM card of the wireless device uses the first random number RAND-1 received from PSKKeyGen, along with AUT-GATEWAY, also received from PSKKeyGen, as well as other information, K-1, the client's already-stored SQN, OP_C-1 and other Milenage application authentication input constants (C1-1 through C5-1) and rotation integers (R1-1 through R5-1), which are permanently, uniquely, and securely made into the SIM when it is manufactured, to generate an Expected network authentication code ("XMAC") as well as a Result ("RES"), the Confidentiality Key CK-1 and Integrity Key IK-1. The SIM compares the MAC, which is a portion of AUT-GATEWAY, received from PSKKeyGen with the XMAC at step 820. In the event of a determination of a mismatch at step 820, application authentication code running in the wireless device's SIM determines whether the SQN matches the SQN received from the PSKKeyGen in the AUT_GATE-WAY. If they match, the wireless device sends an Authentication Failure to the PSKKeyGen at step 840. The reason for sending this message back to the PSKKeyGen is that there are only a few data component values that are used to generate the XMAC and if the SQN is not the cause of the mismatch, then one of the fixed Milenage application authentication input values may have changed, either in database 190 shown in FIG. 1 or in SIM card 120 (also shown as SIM 500 in FIG. 5), or, (more likely) a communications error has modified at least one bit and the appropriate response is to begin update process 700 again. Returning to step 820, if MAC equals XMAC, method 700 advances to PATH A shown in FIG. 10, which will be discussed infra. If a determination is made at step 820 that MAC does not equal XMAC, and SQN does not match SQN_C, the endpoint performing method 700 sends a RESYNC SQN message to the other endpoint at step 835.

Figure 9:
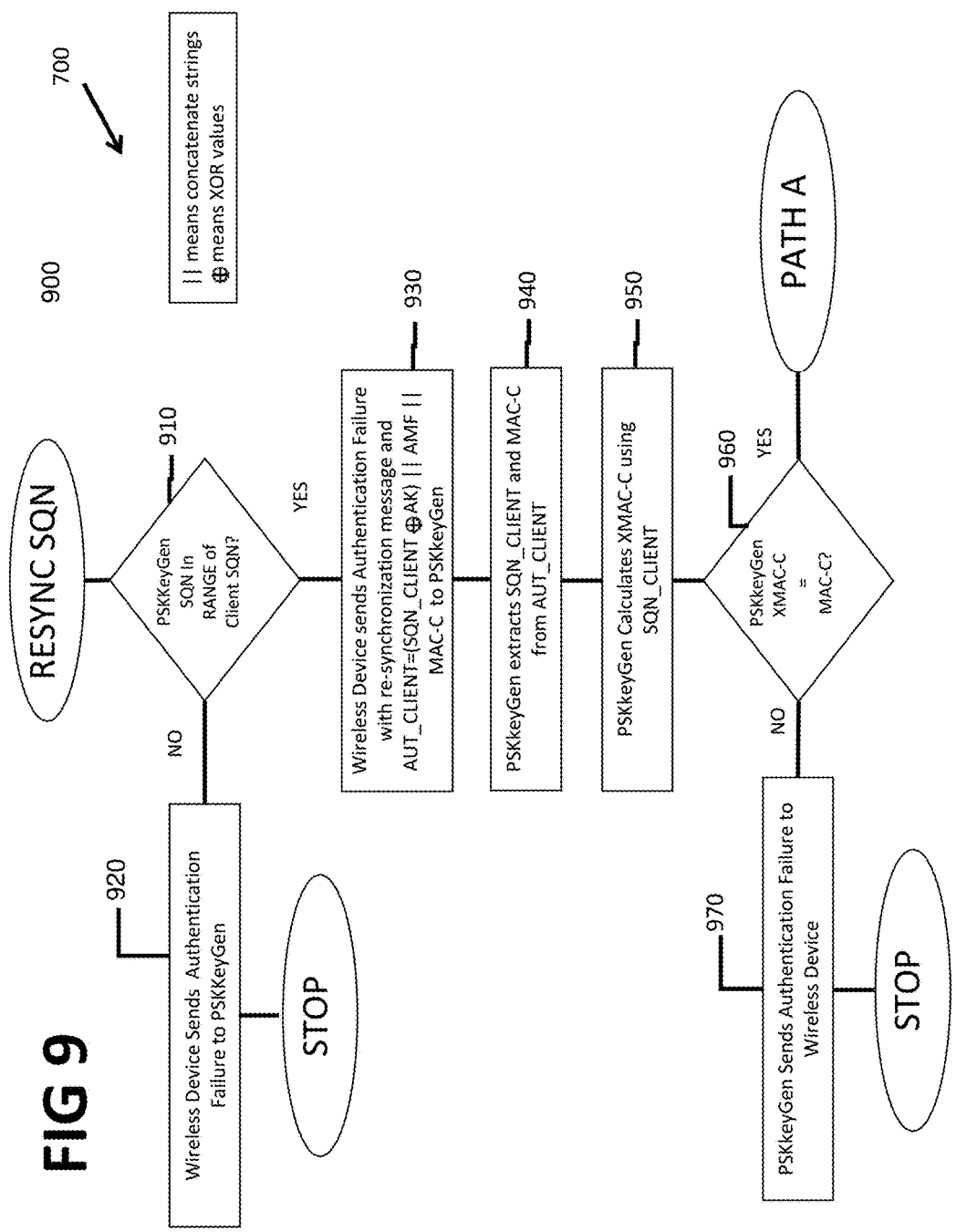

Turning now to FIG. 9, the figure illustrates the RESYNC SQN method 900 that method 700 may follow at step 835 after determining at step 830 shown in FIG. 8 that the SQN value received by the wireless device's SIM does not match the SQN value currently stored therein. The first step at 910 is to check the SQN to determine whether it is within a specified range. An acceptable range may be preferably in the range of 2 or 3, either higher or lower. If the SQN value received is outside of this range, then likely something more than a minor miscount has occurred, such as, for example, either the host, or client, is being attacked by an imposter system masquerading as a genuine client, or host, respectively attempting to connect and re-establish a working key. At step 920, the wireless device sends an authentication failure to the PSKKeyGen in the event of the aforementioned SQN out-of-range failure.

If the SQN is within an acceptable error range, the process moves into a resynchronization process at 930. Causes of an SQN error include an error in the PSKKeyGen database requiring a database restoration or a power failure during a write of the SQN in the SIM card in the wireless device. The resynchronization process automatically recovers the SQN synchronization on both ends. At step 930, the wireless device forwards an authentication failed and resynchronization notice to the PSKKeyGen along with AUT_CLIENT that includes the SQN that is currently present in the SIM card. At step 940, the PSKKeyGen extracts the SQN_Client from the AUT_CLIENT and subsequently calculates the expected MAC at step 950, using the stored credentials, and compares XMAC-C to the MAC-C at decision block 960. If again there is a failure, specifically the XMAC-C and the MAC-C fail to match, an authentication failure message is sent at 970 to the wireless device and method 700 ends, or perhaps returns to START shown in FIG. 7. If the XMAC-C and the MAC-C match at step 960 in FIG. 9, method 700 continues and follows PATH A shown in FIG. 10.

Figure 10:
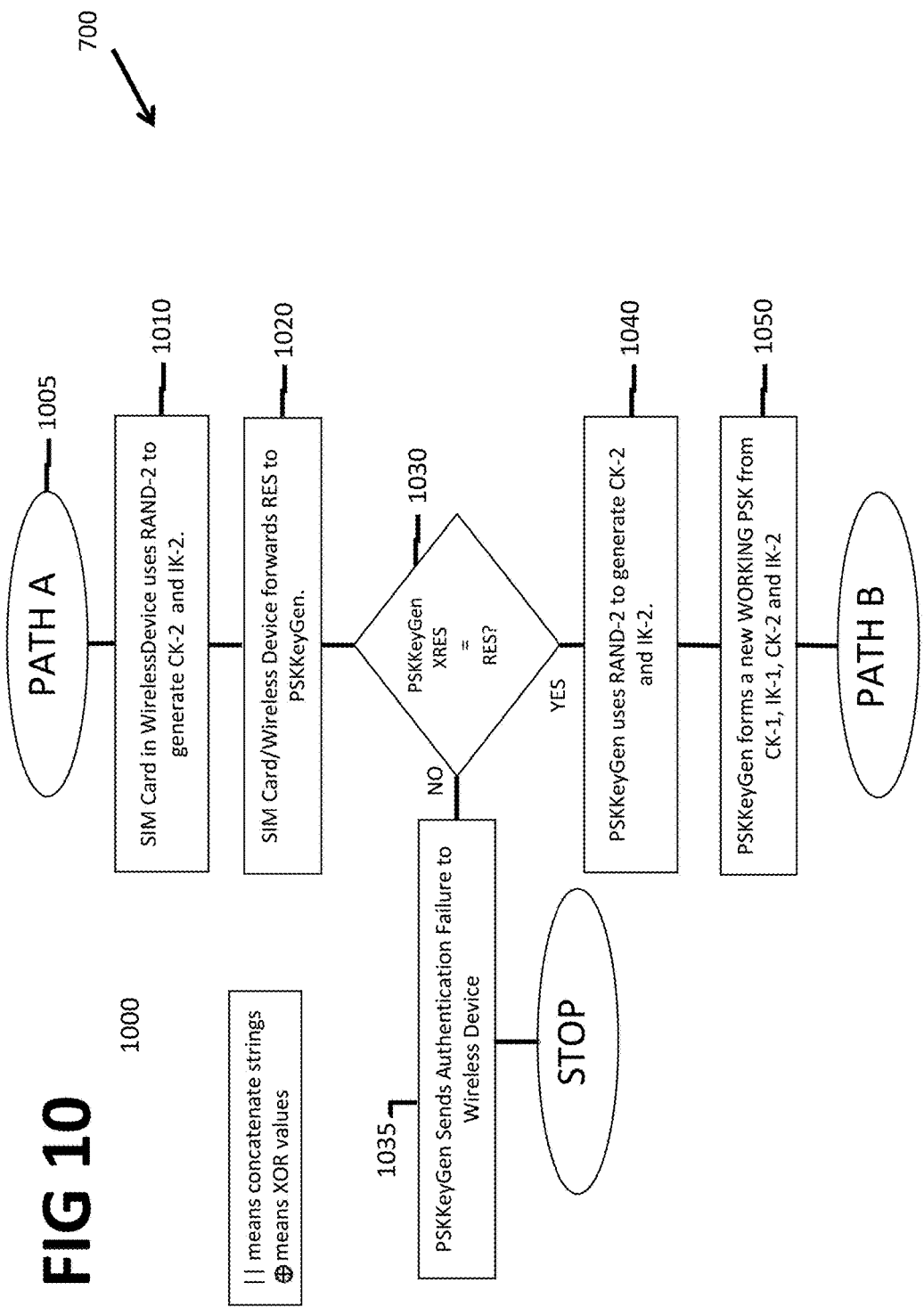

Turning now to FIG. 10, steps of PATH A, referred to in FIG. 10 as 1000, is reached after the wireless device has authenticated the network or as part of a resynchronization process as described above in reference to FIG. 9. Either the wireless/client device determining that the initial MAC equals XMAC at step 820 causes method 700 to reach step 1005, or successfully completing step 960 of SQN resynchronization 900, and the providing of a new SQN to the PSKKeyGen causes method 700 to reach step 1005.

At step 1010, the SIM card performs a second pass of Milenage and generates a second set of keying material/information CK-2 and IK-2 using the second random number RAND-2 . At step 1020, the SIM card/wireless device forwards RES, calculated at step 810 on FIG. 8, to the PSKKeyGen 180 shown in FIG. 1. At step 1030, the PSKKeyGen compares the RES calculated and forwarded by the SIM/wireless device to the expected result XRES, calculated locally by the PSKKeyGen using stored parameters. If there is a mismatch at this stage, the PSKKeyGen sends an authentication failure to the wireless device at 1035. If at step 1030, XRES matches the received RES, then at step 1040 the PSKKeyGen uses the second random number, RAND-2 to generate the second set of keying material/information. At step 1050, the PSKKeyGen forms a new WORKING PSK from the calculated values CK-1, IK-1, CK-2 and IK-2. CK-1, IK-1, CK-2 and IK-2 are independently calculated by both the SIM/wireless device and the PSKKeyGen, using the same information that they have independently determined, and are never sent over any open communications channel and never traverse the communications channel between the SIM/wireless device and the server that the wireless device communicates with. After completing step 1050, method 1000 advances to step 1110 shown in FIG. 11.

Figure 11:
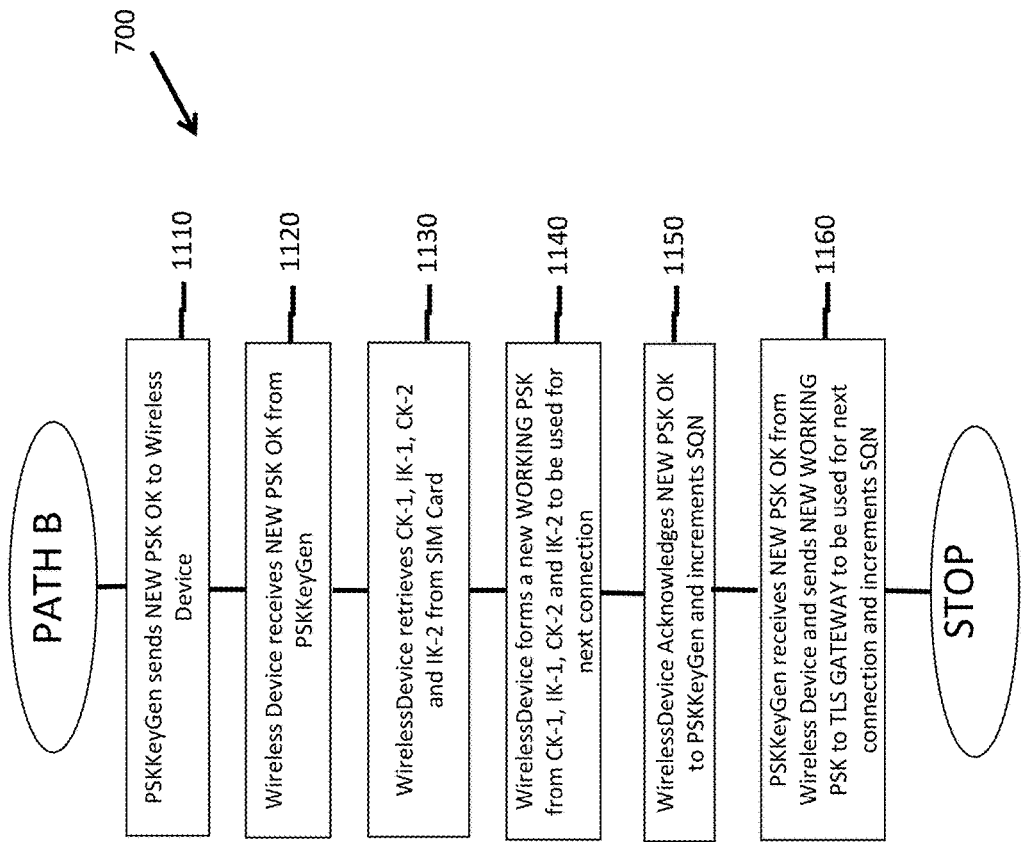

FIG. 11 illustrates a flow diagram of final steps of method 700 that generate a new WORKING PSK for use for encrypting and decrypting data using a symmetric encryption/decryption algorithm by an application running on wireless device 110 shown in FIG. 1 and an application server that is part of private network 175. At step 1110, the PSKKeyGen sends a NEW PSK OK message to the wireless device. This message is used for keeping the application server and wireless device application in synchronization. In the event of an abnormal termination of process 700 in any stage depicted in FIG. 7, 8, 9, 10, or 11, the sending and receiving of the NEW PSK OK message is what permits the Milenage algorithm at the receiving device (either wireless device SIM card or application server) to increment its corresponding SQN counter (SQN cannot be decremented to the SIM card of device 110 shown in FIG. 1). At step 1120, the wireless device receives the NEW PSK OK message and it subsequently retrieves previously determined CK-1, IK-1, CK-2 and IK-2 from the SIM card at step 1130. The wireless device forms a new WORKING PSK at step 1140, from the CK-1, IK-1, CK-2 and IK-2 retrieved from the SIM. As was the case with keying material used by PSKKeyGen node 180, the keying material used by the wireless device 110 is never transmitted over an open communications channel and specifically remains within the wireless device. The SIM overwrites the previous, existing working PSK with the newly-generated WORKING PSK. At step 1150, after generating the new WORKING PSK, the wireless device sends the NEW PSK OK message back to the PSKKeyGen and the SIM card increments the SQN. This step, similar to the step by the PSKKeyGen at 1110, is important to keep the SIM card and the network-based server containing the PSKKeyGen in synchronization as previously discussed. Once the PSKKeyGen receives the NEW PSK OK message from the wireless device, the PSKKeyGEN commits the NEW WORKING PSK by providing it to the TLS GATWAY for the next data connection/session between an application running on device 110 and an application server of private network 175 as shown in FIG. 1. At step 1160, after receiving the NEW PSK OK, the PSKKeyGen increments the SQN so that during the next update of the working PSK, the SQN is still in synchronization between the SIM card of the wireless device, and the application server of network 175 and an application running on device 110 both use their corresponding just-calculated WORKING PSK for encrypting and decrypting data using a symmetric algorithm.

These methods and systems described in the previous paragraphs describe a solution for pre-shared key generation and management for application level security in a wireless wide area network where a SIM card is present for the purposes of identification, authentication, and certification of the credentials for accessing wireless services. These methods use a new type of SIM card with storage portions that store application secret data used for authenticating applications and calculating a new pre-shared key for the purposes of application security. The secret security keys are securely stored and cannot be accessed by means outside of the SIM card. A second important aspect is that the security keys used for application security are easily updatable thru the system disclosed. Although this disclosure highlights the key creation of symmetric keys for use in TLS-PSK, it should be recognized that the methods and systems disclosed herein are applicable for any application security solution requiring symmetric keys.

Another important aspect is that although the solution is intended for wireless devices that are connected to a WWAN network where a SIM card is already present, for example a 2G GSM, 3G HSPA, or 4G LTE network, the SIM card methods could be applied to other devices where a SIM or SIM like device is installed and that are connected to the internet, whether wireless or wired. Although Milenage is highlighted as the preferred algorithm embodiment, newer SIM card algorithms like TUAK and future SIM card algorithms may also be substituted for Milenage and with similar storage of parameters combined and processed to generate an external PSK for short-term or long-term application security. Algorithms other than Milenage generally generate similar parameters, such as RES, XRES, MAC, and XMAC and use them in a similar manner as Milenage, but those skilled in the art may refer to the parameters differently. These different parameters that are used in similar ways as the ways disclosed and claimed herein are within the scope of the claims. In addition, instead of a SIM card, the methods disclosed herein may be embodied in hardware built into a wireless device (i.e., a chip dedicated to performing the methods disclosed herein) such that a SIM need not be part of the wireless device, or device connected via a wireless network, on which an application is running that carries out data transfer with an application server via a secure network session. Also, instead of a single identity module (i.e., a SIM card) that includes both a wireless network authentication algorithm input memory portion for storing network authentication inputs used to authenticate a wireless device that uses the identity module for communication over a wireless communication network, and an application authentication algorithm input memory portion for storing application authentication inputs used to authenticate one or more applications executed by the wireless device to a remote application server or used to generate a new preshared key, the wireless network authentication algorithm input memory portion and the application authentication algorithm input memory portion may be contained by separate identity modules, or similar circuitry, within a given device.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents. Disclosure of particular hardware is given for purposes of example. Some steps recited in the method claims below may be performed in a different order than presented in the claims and still be with the scope of the recited claims.

What is claimed is:

1. A system, comprising:
    an identity module having:
        a wireless network authentication algorithm input memory portion for storing network authentication inputs used to authenticate a wireless device that uses the identity module for communication over a wireless communication network;
        an application authentication algorithm input memory portion for storing application authentication inputs used to authenticate one or more applications executed by the wireless device to a remote application server;
        an authentication algorithm processing engine; and
        wherein the authentication algorithm processing engine of the identity module is to: use the network authentication inputs stored in the wireless network authentication algorithm input memory portion to authenticate the wireless device, and to separately use the application authentication inputs stored in the authentication algorithm input memory portion to authenticate one of the one or more applications to the remote application server.

2. The system of claim 1, wherein the authentication algorithm processing engine is a Milenage engine.

3. The system of claim 1, wherein the remote application server has stored therein the application authentication inputs.

4. The system of claim 1, wherein the identity module is a SIM card.

5. The system of claim 3, wherein the remote application server includes mobile application middleware that facilitates accessibility between the wireless device that includes the identity module and a private network backend server.

6. The system of claim 1, wherein the application authentication algorithm processing engine, substantially simultaneously with the remote application server that performs a similar application authentication algorithm, determines a working pre-shared key for use during a data session with the remote application server, wherein the application authentication inputs stored in the authentication algorithm input memory portion of the identity module are used to determine the working pre-shared key.

7. The system of claim 6, wherein the pre-shared key is not shared with the remote application server.

8. The system of claim 1, wherein the authentication algorithm processing engine of the identity module is further to generate a new pre-shared key for use in encrypting and decrypting data of a secure communication session between the one or more applications associated with a device that includes the identity module and the remote application server.

9. The system of claim 8, wherein the authentication algorithm processing engine generates a new pre-shared key when a determination is made at either the remote application server or at the device that includes the identity module to generate a new pre-shared key for use by the remote application server and the device that includes the identity module for a data session there between.

10. The system of claim 1, wherein the authentication of the one or more applications executed by the wireless device to a remote application server includes generating a value for use as a pre-shared key (PSK) for use in securely communicating data with the remote application server.

11. A method, comprising:
    transmitting from a first network endpoint to a second network endpoint over a communication network a message to request establishment of a secure session;
    receiving from the second network endpoint a message requesting that the first endpoint update an existing pre-shared key that is unique to the first endpoint for use for the secure session;
    transmitting a pre-shared key identifier (PSK-ID) from the first endpoint to the second network endpoint;
    receiving at the first endpoint a first random number, a second random number, and a remote endpoint authentication value from the second network endpoint, wherein the remote endpoint authentication value is based on secret data that is accessible only by the second endpoint and that is associated with the pre-shared key identifier (PSK-ID) and wherein the remote endpoint authentication value includes a network authentication code (MAC);
    generating, with an authentication algorithm processing engine of an identity module associated with the first endpoint, an expected network authentication code (XMAC) and a result value (RES) by processing secret data, which is associated in the identity module with the first endpoint, with the first random number if the received network authentication code (MAC) equals the expected network authentication code (XMAC), transmitting the result value RES from the first endpoint to the second endpoint; and
    generating at the first endpoint a new pre-shared key to replace the existing pre-shared key when the first endpoint receives a message from the second endpoint that the second endpoint has successfully generated a new pre-shared key for use for secure communication by the first endpoint, wherein the new pre-shared key generated by the first endpoint is based on the second random number, the secret data that is associated with the first endpoint in the identity module, and values included in the remote endpoint authentication value.

12. The method of claim 11, wherein the first endpoint is a SIM card of a wireless communication device.

13. The method of claim 11, wherein the second endpoint is a pre-shared key generator.

14. The method of claim 13, wherein the pre-shared key generator is part of a communication network that includes a remote application server with which the first endpoint seeks to establish the secure session.

15. The method of claim 12, wherein the SIM card contains an application authentication algorithm input memory portion for storing application authentication inputs, including the secret data, used by an authentication algorithm processing engine that is to generate the pre-shared Key (PSK) that matches the new pre-shared key generated by the second endpoint;
wherein the pre-shared key is a combination of outputs generated from more than one execution of the algorithm processing engine;
and wherein each of the more than one execution of the algorithm processing engine uses a different set of authentication algorithm inputs stored in the application authentication algorithm input memory portion.

16. A method, comprising:
receiving from a first endpoint at a second endpoint over a communication network a message to request establishment of a secure session;
determining that an existing pre-shared key that had been established for use with secure communications sessions with the first endpoint should be updated at the first and second endpoints;
transmitting from the second endpoint a message requesting that the first endpoint update an existing pre-shared key for use for the secure session;
receiving a pre-shared key identifier (PSK-ID) from the first network endpoint at the second network endpoint, wherein the PSK-ID is unique to the first endpoint;
transmitting to the first network endpoint a first random number, a second random number, and a remote endpoint authentication value, wherein the remote endpoint authentication value is based on secret data that is accessible only by the second network device and that is associated with the pre-shared key identifier (PSK-ID) and wherein the remote endpoint authentication value includes a network authentication code (MAC);
receiving from the first endpoint a result value RES;
evaluating the result value (RES) received from the first endpoint; and
transmitting, based on of the evaluation of the result value (RES), a message to the first endpoint that the second endpoint has successfully generated a new pre-shared key for use for secure communication with the first endpoint, wherein the new pre-shared key generated by the second network endpoint is based on the second random number, the secret data that is associated with the pre-shared key identifier (PSK-ID), and the result value (RES).

17. The method of claim 16, wherein the first endpoint is a SIM card of a wireless communication device; and wherein the pre-shared key is unique to the first endpoint.

18. The method of claim 17, wherein the SIM card contains an application authentication algorithm input memory portion for storing application authentication inputs used to authenticate one or more applications executed by the wireless device to a remote application server and an authentication algorithm processing engine that is to use the application authentication inputs stored in the authentication algorithm input memory portion to authenticate one of the one or more applications to the remote application server, wherein the authentication of the one or more applications to the remote application server includes generating at the SIM card a pre-shared Key (PSK) that matches the PSK generated by the second endpoint;
wherein the pre-shared key is a combination of outputs generated from more than one execution of the algorithm processing engine; and
wherein each of the more than one execution of the algorithm processing engine uses a different set of authentication algorithm inputs stored in the application authentication algorithm input memory portion.

19. The method of claim 16, wherein the determination that a new pre-shared Key (PSK) should be generated is based on predetermined trigger event logic, the trigger event logic being that a new PSK must be generated for every request for a new secure session.

20. The method of claim 16, wherein the determination that a new pre-shared Key (PSK) should be generated is based on predetermined trigger event logic, the trigger event logic being that a new PSK must be generated after a predetermined period has elapsed since the existing pre-shared Key was established.

* * * * *